(12) United States Patent
Serhan et al.

(10) Patent No.: US 12,526,000 B2
(45) Date of Patent: Jan. 13, 2026

(54) RADIO FREQUENCY TRANSMISSION FRONT-END MODULE AND ASSOCIATED MANUFACTURING METHOD

(71) Applicant: COMMISSARIAT A L'ENERGIE ATOMIQUE ET AUX ENERGIES ALTERNATIVES, Paris (FR)

(72) Inventors: Ayssar Serhan, Grenoble (FR); Pascal Reynier, Grenoble (FR); Alexandre Giry, Grenoble (FR); Perceval Coudrain, Grenoble (FR); Jean-Philippe Michel, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 301 days.

(21) Appl. No.: 18/470,481

(22) Filed: Sep. 20, 2023

(65) Prior Publication Data

US 2024/0097721 A1 Mar. 21, 2024

(30) Foreign Application Priority Data

Sep. 21, 2022 (FR) .................................. 22 09567

(51) Int. Cl.
  *H04B 1/04* (2006.01)
  *H01L 23/31* (2006.01)
  *H01L 23/64* (2006.01)
  *H04B 1/036* (2006.01)

(52) U.S. Cl.
  CPC ............... *H04B 1/04* (2013.01); *H04B 1/036* (2013.01)

(58) Field of Classification Search
  None
  See application file for complete search history.

(56) References Cited

U.S. PATENT DOCUMENTS

| 9,142,490 | B2* | 9/2015 | Park | H01L 21/76898 |
| 9,905,633 | B1* | 2/2018 | Yang | H01L 21/76816 |
| 11,152,677 | B2 | 10/2021 | Cui et al. | |
| 12,234,192 | B2* | 2/2025 | Hill | C04B 35/64 |
| 2013/0009321 | A1* | 1/2013 | Kagawa | H01L 23/564 |
| | | | | 438/455 |
| 2014/0035154 | A1* | 2/2014 | Geitner | H01L 24/96 |
| | | | | 257/E23.116 |

(Continued)

FOREIGN PATENT DOCUMENTS

WO  WO 2022/126015 A1  6/2022

OTHER PUBLICATIONS

Preliminary French Search Report issued Jul. 21, 2023 in French Application 22 09567 filed on Sep. 21, 2022, 10 pages (with English Translation of Categories of Cited Documents & Written Opinion).

(Continued)

*Primary Examiner* — Pablo N Tran
(74) *Attorney, Agent, or Firm* — Oblon, McClelland, Maier & Neustadt, L.L.P.

(57) ABSTRACT

An integration system and method for the manufacture of radio frequency transmission front-end modules with radio frequency integrated circuit(s) and self-biased magnetic component(s) integrated on a "Wafer Level Packaging"-type technology. This integration makes it possible to design efficient, compact and low-cost front-end modules.

23 Claims, 34 Drawing Sheets

(56) References Cited

U.S. PATENT DOCUMENTS

| | | | |
|---|---|---|---|
| 2015/0194388 A1* | 7/2015 | Pabst | H01L 21/768 257/659 |
| 2017/0178990 A1 | 6/2017 | Oster et al. | |
| 2017/0186799 A1* | 6/2017 | Lin | H10F 39/018 |
| 2018/0166763 A1 | 6/2018 | Cruickshank et al. | |
| 2018/0269708 A1* | 9/2018 | Yeh | H02J 50/005 |
| 2018/0277458 A1 | 9/2018 | Oster et al. | |
| 2018/0330854 A1* | 11/2018 | Hill | H01F 1/10 |
| 2019/0131681 A1 | 5/2019 | Ferizovic et al. | |
| 2020/0153071 A1 | 5/2020 | Cui et al. | |
| 2020/0294970 A1* | 9/2020 | Uh | H01L 25/0657 |
| 2023/0387042 A1* | 11/2023 | Costa | H01L 24/16 |

OTHER PUBLICATIONS

Oliver et al., "Integrated Self-Biased Hexaferrite Microstrip Circulators for Millimeter-Wavelength Applications", IEEE Transactions on Microwave Theory and Techniques, vol. 49, No. 2, Feb. 2001, 3 pages.

Chao et al., "Millimeter Wave Hexagonal Nano-Ferrite Circulator on Silicon CMOS Substrate", IEEE, 2014, 4 pages.

Peng et al., "Self-Biased Microstrip Junction Circulator Based on Barium Ferrite Thin Films for Monolithic Microwave Integrated Circuits", IEEE Transactions on Magnetics, vol. 47, No. 6, Jun. 2011, 4 pages.

Zhang et al., "A novel CMOS hexaferrite circulator with 25 GHz operating frequency", AIP Advances 11, 045022, 2021, 8 pages.

Cui et al., "Monolithic Integration of Self-Biased C-Band Circulator on SiC Substrate for GaN MMIC Applications", IEEE Electron Device Letters, vol. 40, No. 8, Aug. 2019, 4 pages.

Cui et al., "Integration of Self-Biased Circulators on GaN/SiC for Ka-band RF application", IEEE, 2019, 2 pages.

Cao et al., "Qorvo's Emerging GaN Technologies for mmWave Applications", 2020 IEEE/MTT-S International Microwave Symposium, 2020, 3 pages.

Chen et al., "Ferrite film growth on semiconductor substrates towards microwave and millimeter wave integrated circuits", Journal of Applied Physics 112, 081101, 2012, 12 pages.

Palmer et al., "A Bright Future for Integrated Magnetics", IEEE Microwave Magazine, Jun. 2019, 15 pages.

Bowrothu et al., "Batch-Fabricated Substrate-Embedded $K_a$ Band Self-Biased Circulators Using Screen-Printed Strontium Hexaferrite/PDMS Composite", 2021 IEEE/MTT-S International Microwave Symposium, 2021, 4 pages.

Gellersen et al., "A Sol-Gel Approach for Self-Biased Barium Hexaferrite Thin-Film Circulators", Proceedings of the 46th European Microwave Conference, 2016, 4 pages.

Feng et al., "Performance Improvement of Embedded Microstrip Circulators in Printed Circuit Board", Proceedings of the 2017 Asia Pacific Microwave Conference, 2017, 4 pages.

\* cited by examiner

RADIO FREQUENCY TRANSMISSION FRONT-END MODULE AND ASSOCIATED MANUFACTURING METHOD

TECHNICAL FIELD

The present invention relates to the field of integrating radio frequency transmission front-end modules. It has particularly advantageous applications in the fields of mobile telephony, telecommunication infrastructure, automotive, defence and space.

STATE OF THE ART

Significant efforts are currently being provided by the industry and research for integrating magnetic functions, such as those of self-biased/magnet-free magnetic material-based circulators, even isolators and/or other gyrators in radio frequency transmission front-end modules. The necessity to reduce the size of front-end modules is indeed known and integration solutions are proposed to respond to them. Three main areas of innovation can be released, which are based around developments relating to packaging technologies, developments relating to three-dimensional integration techniques and developments relating to the magnetic materials themselves.

Thus, there are several approaches which can be classified according to the semiconductive or dielectric nature of the substrate on which the magnetic function considered must be integrated.

For the monolithic integration of a magnetic function on a semiconductive substrate, there are mainly two challenges to overcome:
  The synthesis of a self-biased/magnet-free magnetic material having the ferromagnetic properties required to enable a reciprocal behaviour and low losses, and
  The integration of the material making it possible to perform the magnetic function in a semiconductive substrate with few additional steps of the manufacturing method and without degrading the ferromagnetic properties of the self-biased/magnet-free magnetic material and/or the surrounding semiconductive components.

As responses to these challenges, the following is in particular known:
  a first integration solution consisting of depositing the magnetic material, obtained beforehand by the coating, under centrifugation of a ferrite and photosensitive resin mixture, in a cavity formed in a semiconductive substrate, and
  a second solution described in patent documents, referenced US 2020/0153071 A1 and US 2019/0131681 A1, which relate to methods for manufacturing a self-biased circulator in an integrated circuit.

The first solution has the advantage of being compatible with CMOS manufacturing methods. However, this solution has at least one of the following major limitations:
  A high manufacturing cost,
  A negative impact on the efficiency of the CMOS manufacturing method,
  An increase in the loss of insertion when the substrate has a low resistance, and
  A limitation of the thickness of the deposition of the magnetic material limiting its power handling and its frequency of use.

The second solution consists:
  of providing an integrated circuit on an III-V substrate,
  of creating or etching a cavity on the back side of the III-V substrate and under the integrated circuit, then
  of depositing the magnetic material necessary to perform the desired magnetic function.

The magnetic material can be deposited/cast in the cavity or a disc of the magnetic material can be transferred into the cavity. In the latter case, a non-conductive epoxy resin can be used to fill a space between the magnetic material disc and the side walls of the cavity, so as to stabilise the disc, including under high vibration conditions, and to ensure that no foreign material introduces structural defects, in particular, during subsequent steps of the assembly.

This second solution has at least one of the following disadvantages:
  The squandering of the semiconductive substrate and of the support space that it offers; in particular, when the substrate is of the III-V type, such substrate being limited in size,
  The limitation of the thickness of the magnetic material by the thickness of the substrate, particularly as the substrates are often tapered, and
  The necessity to etch a cavity wider than the magnetic material, and to fill the remaining free space, so as to mechanically stabilise the magnetic disc.

As mentioned above, there are also methods for integrating magnetic functions in dielectric substrates (ceramic substrate, PCB, etc.). One of these methods is described in the patent document, referenced US 2018/0166763 A1. The solution proposed in this document comprises, on the one hand, the embodiment of a self-biased magnetic material disc, on the other hand, the embodiment of a cavity in the dielectric substrate. The cavity is intended to house the magnetic disc. Once the disc is inserted in the cavity formed in the dielectric substrate, it all is annealed to ensure that the disc and the dielectric substrate are mechanically bonded to one another. Other solutions for integrating magnetic functions in dielectric substrates comprise a step of depositing the material intended to enable the magnetic function to be integrated in a cavity formed in the dielectric substrate.

These methods for integrating in substrates have at least one of the following disadvantages:
  The dielectric material constituting the substrate must be able to support annealing temperatures of at least 650° C.; Such dielectrics are often expensive; and reaching high annealing temperatures also has a significant cost,
  The pretreatment of the dielectric substrate to form the cavity(ies) represents additional manufacturing steps which increase the cost and the manufacturing time; and it is difficult to obtain cavities having sufficiently well-defined side walls to enable an easy insertion of the magnetic disc,
  When several magnetic functions are to be integrated, as many cavities are to be produced in the dielectric substrate; yet, such cavities can significantly affect the mechanical integrity of the substrate, in particular, if they are close to one another. Furthermore, the expansion of the dielectric material constituting the substrate is all the more difficult to control during annealing, and
  The thermal dissipation in the assemblies obtained is generally not satisfactory.

It is thus understood that the industrialisation of these methods for integrating magnetic functions in dielectric substrates is difficult to consider/achieve.

An aim of the present invention is therefore to propose a radio frequency transmission front-end module and an associated manufacturing method, which make it possible to overcome at least one, preferably some, of the disadvantages of prior solutions.

An aim of the present invention is more specifically to propose a radio frequency transmission front-end module and an associated manufacturing method, which advantageously lends itself to an industrialisation.

Another aim of the present invention is to propose a radio frequency transmission front-end module and an associated manufacturing method, which make it possible to reduce the cost and/or the size and/or the weight of the radio frequency systems embedding front-end modules.

Other aims, features and advantages of the present invention will appear upon examining the description below and the accompanying drawings. It is understood that other advantages can be added.

SUMMARY

To achieve this aim, a radio frequency transmission front-end module is provided, comprising:
- a radio frequency integrated circuit comprising at least two electrical connecting zones, a first zone of which intended to receive or transmit a signal and a second zone intended to be connected to the ground,
- a disc with the basis of a self-biased magnetic material comprising a first main surface and a second main surface opposite the first, the front-end module being such that it further comprises:
- a first dielectric material and a second dielectric material forming a respective side coating layer of the radio frequency integrated circuit and of the disc by maintaining them mechanically in a relative position to each other, and
- a redistribution layer RDL of electrical connections placed above the coating layer, comprising said first dielectric material, the redistribution layer RDL comprising a metal track for electrically connecting the signal connecting the second main surface of the disc and said first electrical connection zone of the integrated circuit to enable the transmission of an electrical signal between the disc and the integrated circuit.

Also, a method for manufacturing a radio frequency transmission front-end module is provided, comprising:
Providing a radio frequency integrated circuit, a disc with the basis of a self-biased magnetic material, a first carrier substrate and a second carrier substrate, the radio frequency integrated circuit comprising several electrical connection zones, a first zone of which intended to receive and/or transmit an electrical signal and a second zone intended to be connected to the ground, and the disc comprising a first main surface and a second main surface opposite the first, then
Assembling the radio frequency integrated circuit and the disc by means of the first carrier substrate as support for the first steps of manufacturing the front-end module, then as transfer substrate on the second support substrate for the second steps of manufacturing the front-end module; by using at least one from among a first dielectric material and a second dielectric material to form, by a FOWLP-type packaging method, a respective side coating layer of said radio frequency integrated circuit (11) and of the disc and maintaining them mechanically in relative position to each other; by forming a redistribution layer RDL of electrical connections placed above the coating layer comprising said first dielectric material and comprising a metal track for electrical connection, connecting the second main surface of the disc and said first electrical connection zone of the integrated circuit to enable the transmission of an electrical signal between the disc and the integrated circuit.

Thus, a new integration solution is proposed, which enables the manufacture of radio frequency transmission front-end modules with self-biased magnetic component(s) integrated on a technology of the "Wafer Level Packaging"-type. This integration solution is simple and flexible.

The integration solution proposed makes it possible to reduce the cost and/or the size and/or the weight of the radio frequency systems embedding front-end modules, this aim being achieved, in particular, by reducing the distances between the integrated circuit(s) (PA, LNA, etc.), the magnetic component (circulator, isolator, gyrator, etc.) and the antenna.

The solution proposed implements integration techniques:
- to integrate a self-biased magnetic material performing the magnetic function of the front-end module, and
- to assemble the radio frequency integrated circuit(s) of the front-end module in one same package/module.

More specifically, the solution proposed has at least one of the following advantages over the state of the art:
- No use of an external magnet (often very bulky) to bias the magnetic material,
- The wide-surface squandering of expensive semiconductor substrates is avoided, which is particularly interesting as soon as the substrates are of the III-V type,
- A flexibility in the choice of thickness, and of the form factor, of the magnetic material is offered, which enables the optimisation of the magnetic function to be integrated, without compromising the level of loss of insertion and by ensuring the power handling,
- A better control of the position of the magnetic material, including under conditions of high vibrations in operation or in use,
- The necessity for an adhesive or a filling mastic (epoxy resin-based) is avoided. The performances are thus more stable, relative to the frequencies and to the temperatures of operation or of use,
- The manufacture of components of the module, in particular the semiconductive elements of the radio frequency integrated circuits, can be done by means of various known microelectronic techniques, without significant limitation of these means and techniques,
- A compatibility with substrates of 300 mm in diameter is possible for a corresponding reduction of the manufacturing cost and a potential which is further increased in terms of industrialisation capacity,
- A reduction of the energy consumption of front-end modules is achieved by reducing interconnecting losses between the elements performing the integrated magnetic function and the transmission paths, increasing through that, the effectiveness in emission and the sensitivity in reception,
- A compatibility is achieved with the integration of power amplifiers having advanced architectures, such as circulator-based charge modulation power amplifiers, and this, with a form factor justifying their compactness,
- An improvement of the spectral effectiveness is achieved by enabling the simultaneous transmission in one same frequency band (Full-duplex),
- A protection of the power amplifier(s) to the impedance mismatch is achieved,
- A possibility of shielding the electrical field is offered, by preserving the possibility to use vias through the dielectric materials (in particular, according to the technology known as TMV (Through Mould Via)) if needed (and, in particular, on specific parts of the circuit), A compatibility is achieved with the manufacture of radio frequency front-end modules having a waveguide circulator topology integrated in the substrate (or SIW (Substrate Integrated Waveguide)), and The possibility is offered to add, to the radio frequency front-end modules, a radiator with the aim of improving the thermal dissipation of the modules.

Furthermore, the solution proposed makes it possible to utilise the so-called "Copper Pillars" technology, developed at CEA-Leti (research institute for electronics and information technologies of the CEA).

BRIEF DESCRIPTION OF THE FIGURES

The aims, objectives, as well as the features and advantages of the invention will best emerge from the detailed description of embodiments of a front-end module and of embodiments of an associated manufacturing method, which are illustrated by the following accompanying drawings, wherein:

FIGS. 1 to 9 illustrate different steps of a first embodiment, called "Die First", of a method for manufacturing a radio frequency front-end module according to a first embodiment, which is illustrated in FIG. 10.

FIGS. 12 to 21 illustrate different steps of a second embodiment, called "RDL (redistribution layer) First", of a method for manufacturing a radio frequency front-end module according to a second embodiment, which is illustrated in FIG. 22.

FIGS. 37A, 38A and 40A illustrate an alternative of this method.

Figure 1:
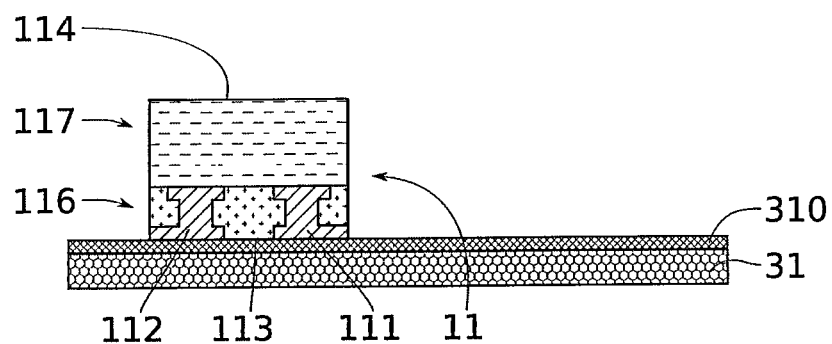

The drawings are given as examples and are not limiting of the invention. They constitute principle schematic representations intended to facilitate the understanding of the invention and are not necessarily to the scale of practical applications. In particular, the relative thicknesses of the different levels, stages, layers or elements are not necessarily representative of reality.

DETAILED DESCRIPTION

Before starting a detailed review of embodiments of the invention, optional features of different embodiments of the module according to the invention are stated below, which can optionally be used in association or alternatively:

According to an example, the first main surface of the disc can be electrically connected to a first external connection pad of the module intended to be connected to the ground, and the second electrical connection zone of the radio frequency integrated circuit can be electrically connected to the first pad or to a second external connection pad of the module and intended to be connected to the ground, also. Complementarily, the first main surface of the disc and the second electrical connection zone of the radio frequency integrated circuit can be connected by a ground conductive track formed in contact with the coating layer comprising the first dielectric material, on the side opposite the redistribution layer RDL.

According to an example, the magnetic component can constitute or comprise at least one from among a circulator, a gyrator and an isolator.

According to an example, the first dielectric material and the second dielectric material can extend over one same level of the front-end module by forming one single layer, wherein the radio frequency integrated circuit and the disc are placed. If necessary, the first dielectric material and the second dielectric material are combined with one another.

Complementarily, the first main surface of the disc and the second electrical connection zone of the radio frequency integrated circuit can be connected by a ground conductive track formed in contact with the coating layer, comprising the first dielectric material, on the side opposite the redistribution layer RDL.

According to an example, alternative to the previous one, the first dielectric material can form a first layer, wherein the radio frequency integrated circuit is integrated and the second dielectric material can form a second layer, wherein the disc is integrated, the second layer of the second dielectric material corresponding totally or partially to consecutive dielectric layers of the distribution layer RDL of electrical connections. For example, the first dielectric material and the second dielectric material are different from one another.

According to an example, the self-biased magnetic material constituting the disc can be with the basis of at least one from among: a ferrite and a hexaferrite.

According to an example, a thickness of the disc between its main surfaces can be greater than a thickness of the radio frequency integrated circuit between its front side and its back side.

According to an example, at least one metal track for electrical connection can have a three-dimensional geometry and/or can be formed on at least two metal levels of electrical connection interconnected with one another by way of metal vias.

According to an example, the radio frequency integrated circuit can have at least one via extending from the back side of the radio frequency integrated circuit through a semiconductive substrate, wherein active components of the radio frequency integrated circuit are formed, such that the back side of the radio frequency integrated circuit constitutes a zone for connection to the ground of the radio frequency integrate circuit. The front-end module according to this example shows that its manufacturing method is compatible, not only with the transfer of a simple-design radio frequency integrated circuit, but also with the transfer of a radio frequency integrated circuit of a more complex design, in particular incorporating connections on its front side and on its back side.

According to an example, the front-end module can be devoid of an adhesive or of a filling mastic, such as a non-conductive epoxy resin, at least around side walls of the disc.

According to an example, the front-end module can be devoid of a permanent magnet.

Always before starting a detailed review of embodiments of the invention, optional features of different embodiments of the manufacturing method according to the invention are stated below, which can optionally be used in association or alternatively:

According to an example, the method can further comprise the formation of an electrical connection between the first main surface of the disc and a first external connection pad of the module intended to be connected to the ground, and the formation of an electrical connection between a second electrical connection zone of the radio frequency integrated circuit and a first pad or a second external connection pad of the module and intended to be connected to the ground, also. Complementarily, the method can comprise the formation of an electrical connection between the first main surface of the disc and the second electrical connection zone of the radio frequency integrated circuit by a ground conductive track formed in contact with the coating layer comprising the first dielectric material, on the side opposite the redistribution layer RDL.

According to an example, one from among the radio frequency integrated circuit and the disc can first be transferred onto either from among the first support substrate and the second support substrate before either from among the first dielectric material and the second dielectric material is used to maintain it mechanically in the position of its transfer, and the other from among the radio frequency integrated circuit and the disc can first be transferred onto either from among the first support and the second support substrate before either from among the first dielectric material and the second dielectric material is used to maintain it mechanically in the position of its transfer.

According to a first variant, the method can further comprise:
 a transfer of the radio frequency integrated circuit and of the disc onto the first carrier substrate, the radio frequency integrated circuit being transferred onto the first carrier substrate by its front side and the disc being transferred onto the first carrier substrate by one of its first and second main surfaces,
 a deposition of the first dielectric material on to the first carrier substrate at least around the radio frequency integrated circuit and of the disc,
 a deposition of a ground metal track,
 to obtain, on the first carrier substrate, a first part of the front-end module, then
 a transfer of the first part of the front-end module from the first carrier substrate onto the second carrier substrate by the side of the first part of the front-end module on which the first ground metal track is exposed,
 such that the first part of the front-end module can be treated from its exposed surface after its transfer, to finish forming the front-end module.

According to an example of the first variant, the method can further comprise:
 A formation of the metal track for electrical connection, either on the exposed surface of the first part of the front-end module after its transfer, or on the first carrier substrate before transfer of the radio frequency integrated circuit and of the disc.

According to another example of the first variant, the formation of the metal track for electrical connection can comprise the creation of at least two metal levels for electrical connection interconnected with one another by way of metal vias through a third dielectric material.

According to another example of the first variant, the method can further comprise, before the deposition of the ground metal track:
 A grinding of the first dielectric material to expose the back side of the radio frequency integrated circuit and the main surface of the disc opposed that by which the disc has been transferred onto the first carrier substrate.

According to another example of its first variant, the method can further comprise, when the deposition of the metal track for electrical connection is done on the first carrier substrate before transfer of the radio frequency integrated circuit and of the disc:
 A formation on the metal track for electrical connection of a metal pillar for electrical connection. The metal pillar can, for example, have a height greater than the greatest from among a thickness of the radio frequency integrated circuit between its front side and its back side and a thickness of the disc between its main surfaces. For example, the formation of the metal track for electrical connection can comprise the creation of at least two metal levels for electrical connection interconnected with one another by way of metal vias through a third dielectric material. For example, the method can further comprise, when the deposition of the first dielectric material is such that it covers the radio frequency integrated circuit and/or the disc, and if necessary, the top of the metal pillar:
a step of grinding the first dielectric material, potentially up to exposing that which is from among the back side of the radio frequency integrated circuit and the main surface of the disc exposed to that by which the disc has been transferred onto the first carrier substrate is the least covered by the first dielectric material, and if necessary, up to exposing the top of the metal pillar.

According to a second variant, the method can further comprise:
a transfer of the radio frequency integrated circuit onto the first carrier substrate by its front side,
a deposition of the first dielectric material on the first carrier substrate at least around the radio frequency integrated circuit,
to obtain, on the first carrier substrate, a first part of the front-end module, then
a transfer of the first part of the front-end module from the first carrier substrate onto the second carrier substrate by the side of the first part of the front-end module opposite that by which the first part of the front-end module rests on the first support substrate,
such that the first part of the front-end module can be treated from its exposed surface after its transfer, to finish forming the front-end module, then
a deposition of a first metal level for electrical connection on the exposed surface of the first part of the front-end module, so as to have two parts electrically separate from one another, each constituting a part of one from among the metal track for electrical connection and the ground metal track,
a deposition of the second dielectric material on the first metal level for electrical connection, then an etching of the second dielectric material, so as to form a cavity located facing the part of the first metal level constituting a part of the metal track for electrical connection and intended to house the disc and so as to form vias to a second metal level for electrical connection to each from among the metal track for electrical connection and the ground metal track,
a transfer of the disc into the formed cavity,
a deposition of the second metal level for electrical connection on the surface of the second dielectric material and the main exposed surface of the disc, so as to each form from among the metal track for electrical connection and the ground metal track, by filling each formed via, and
a formation of input/output pads of the front-end module on the second metal level for electrical connection.

According to a third variant, the method can further comprise:
a deposition of one of the first and second metal levels for electrical connection on the first carrier substrate, so as to have at least two parts electrically separate from one another, each of these two parts constituting a part of one from among the metal track for electrical connection and the ground metal track,
a transfer of the disc on a part of the metal level deposited beforehand, this part constituting a part of the metal track for electrical connection,
a formation of a metal pillar for electrical connection on each of two parts electrically separate from one another from the metal level deposited beforehand, each metal pillar preferably having a height greater than a thickness of the disc between its main surfaces,
a deposition of one from among the first dielectric material and the second dielectric material on the metal level for electrical connection deposited beforehand and at least around the disc,
a deposition of another of the two metal levels for electrical connection on the dielectric material deposited beforehand, an exposed main surface of the disc and the top of each metal pillar, so as to each form from among the metal track for electrical connection and the ground metal track,
a transfer of the radio frequency integrated circuit by its front side on the other of the two metal levels for electrical connection, so as to electrically contact each of the two metal tracks for electrical connection,
a deposition of the other from among the first dielectric material and the second dielectric material on the other of the two metal levels for electrical connection at least around the radio frequency integrated circuit,
to obtain, on the first carrier substrate, a first part of the front-end module,
a transfer of the first part of the front-end module from the first carrier substrate on the second carrier substrate by the side of the first part of the front-end module opposite that by which the first part of the front-end module rests on the first support substrate,
such that the first part of the front-end module can be treated from its exposed surface after its transfer, to finish forming the front-end module, then
a formation of input/output pads of the front-end module on the first metal level for electrical connection.

According to an example, the method can further comprise, after assembly of the radio frequency integrated circuit and of the disc:
the removal of the second carrier substrate.

By an element with the basis of a material A, this means an element comprising this material A, and optionally other materials.

By "self-biased magnetic material", or equally, "magnet-free magnetic material", this means a material having a high uniaxial magnetic anisotropy (with, for example, Ha>20 Oe), a high coercive field (for example, greater than 4000 Oe) and a high saturation magnetisation (for example, greater than 4 kG). These properties lead to a high remanent magnetisation which ensures the self-biased nature of the material. The main magnetic materials used to partially constitute a circulator are, for example, chosen from among hexaferrites, such as barium hexaferrites, strontium hexaferrites and hexaferrites doped with lanthanum and cobalt, and magnetic nanocomposites, such as nanowires with the basis of an iron and nickel alloy and those with the basis of an iron and cobalt alloy. Said material can be magnetised in a given direction by using an external magnetic field, for example generated by a powerful permanent magnet, either during a phase for preparing the material, or during a deposition of a ferrite film and an integration phase.

It is specified that, in the scope of the present invention, the terms "on", "surmounts", "covers", "underlying", "opposite" and their equivalents do not necessarily mean "in contact with". Thus, for example, the deposition, the transfer, the bonding, the assembly or the application of a first element on a second element, does not compulsorily mean that the two elements are directly in contact with one another, but means that the first element covers at least partially the second element by being either directly in contact with it, or by being separated by at least one other element.

By "redistribution layer", more known as RDL, this means a layer structured and configured to make input/output pads of an integrated circuit available at other placements of a microelectronic assembly, thus ensuring a better access to the pads, if necessary. Such a redistribution layer RDL thus comprises metal tacks on one or more levels separated by an isolating material and connected by metal conductive vias. The notion of RDL is conventionally used to mean metal interconnections made in a packaging method, aiming to prepare an electronic module comprising one or more chips and optionally other electronic components.

It will be noted that there are several types of packaging and of associated methods. In the present application, the methods described all use a FOWLP (Fan-Out Wafer-Level Packaging)-type technique. An FOWLP method is a packaging method "which spread outside, or beyond, a chip or more generally a component" that it sought to be packaged, or "packed". Thus, the result of an FOWLP method is such that the packed chip is surrounded laterally by an isolating material. The FOWLP method is thus "the opposite" of a FIWLP (Fan-In Wafer-Level Packaging) method, wherein the chip is not covered laterally by an isolator, but will only be packaged on the top and/or on the bottom.

Once the module is produced, by FOWLP-type packaging methods, a module is obtained which has a front side, and a back side. The elements, of the chip-type, present in the module are connected, by metal tracks of the RDL, to external connection pads present on the front side and/or the back side of the module.

By a "BEOL" (Back End of Line), this means an internal part of an integrated circuit, or chip, which is composed of conductive tracks made on n metal levels and interconnected by metal vias buried in a dielectric material, generally an oxide. This BEOL part is made on an FEOL (Front End of Line) part, which comprises a semiconductive substrate in and above which electronic components are made, for example, transistors.

Thus, a redistribution layer RDL and a BEOL have in common the fact of having metal tracks on several levels and interconnected by vias. However, RDL and BEOL refer to different manufacturing methods. BEOL is referred to, when this relates to an electronic chip manufacturing method, including one or more semiconductive layers constituting a FEOL, the BEOL corresponding to the last manufacturing steps. Redistribution layer(s) RDL is/are referred to, when this relates to a phase of packing, or packaging, one or more chips. The RDL can be done before, or after, transfer of an electronic chip, as will be illustrated in the examples below.

Figure 9:
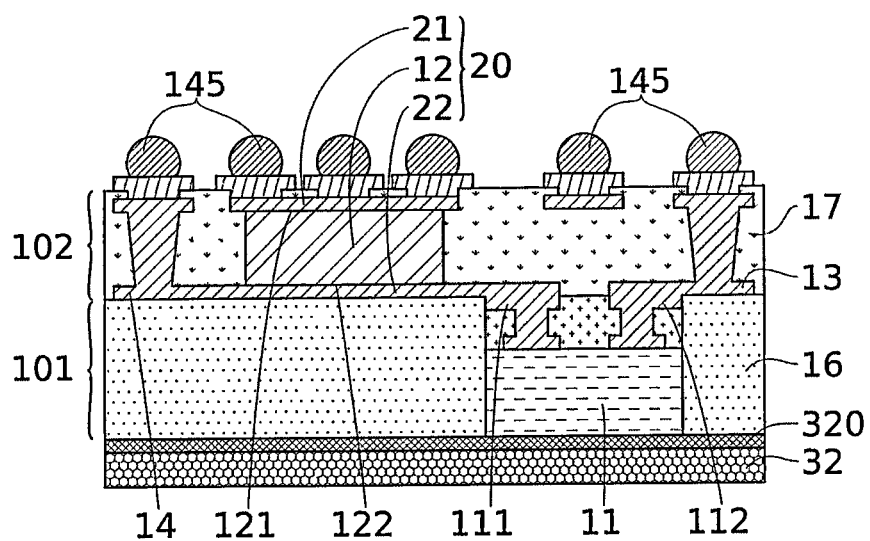
Figure 10:
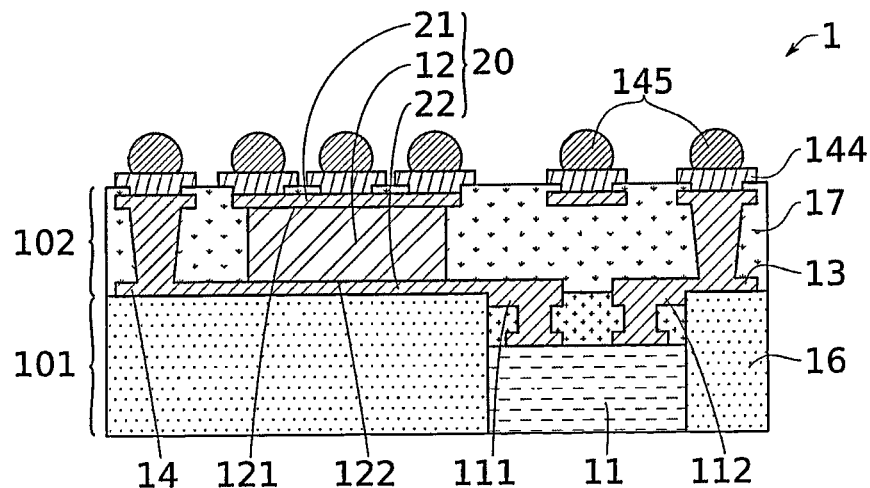
FIG. 10 illustrates a cross-sectional view of a first embodiment of a radio frequency front-end module according to the invention obtained by implementation of the "Die First" manufacturing method.
Figure 20:
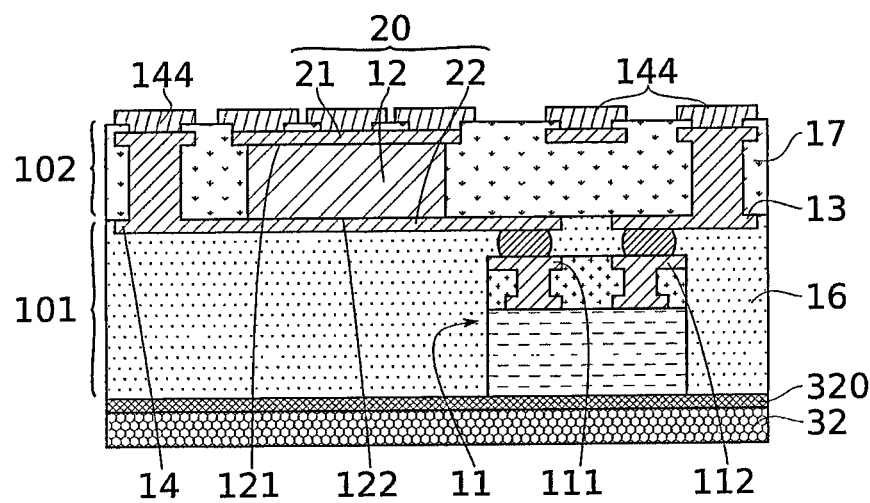
Figure 21:
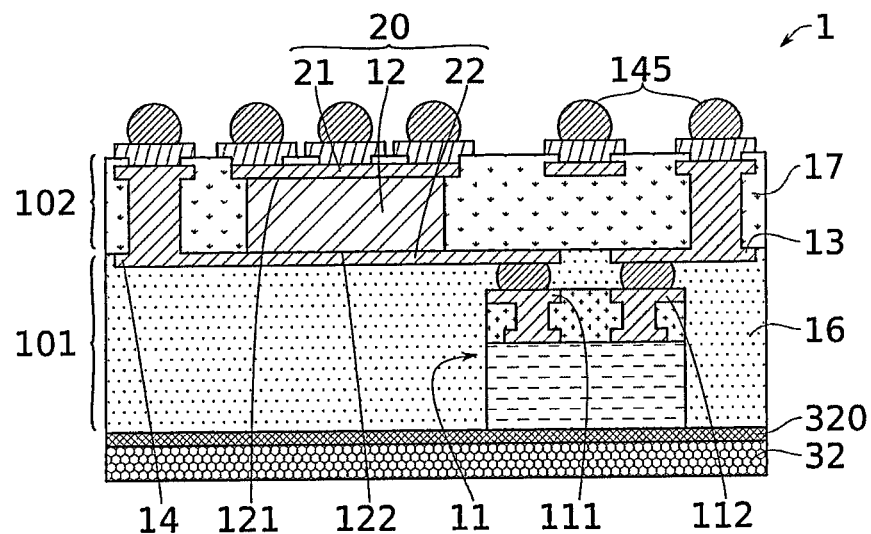
Figure 22:
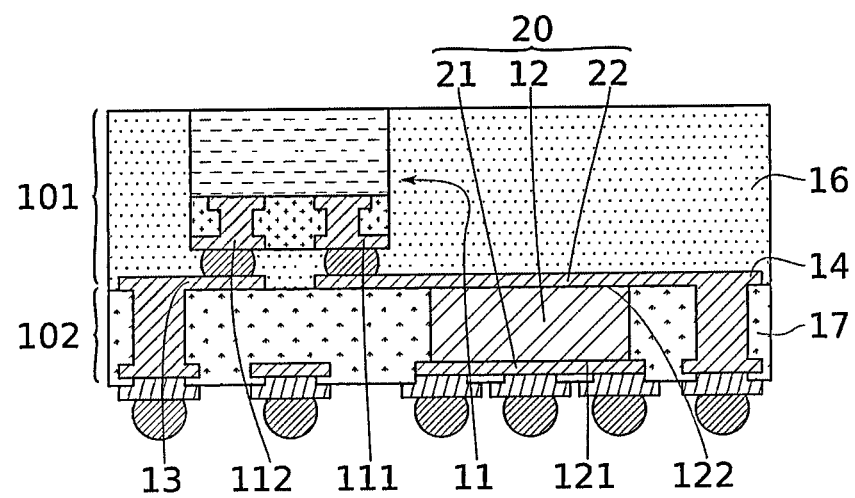
FIG. 22 illustrates a cross-sectional view of a second embodiment of a radio frequency front-end module according to the invention obtained by implementation of the "RDL First" manufacturing method.
Figure 31:
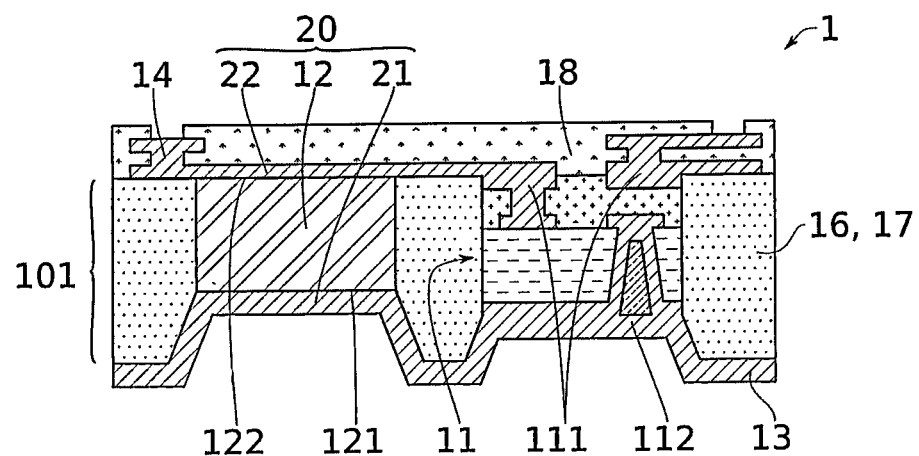
FIG. 31 illustrates a cross-sectional view of a third embodiment of the radio frequency front-end module according to the invention obtained by implementation of the "Die First" manufacturing method.

FIGS. 10 and 22 each illustrate a cross-sectional view of two embodiments of the front-end module 1, similar in their arrangement at two levels, and obtained respectively by a so-called "Die First" manufacturing method (illustrated by FIGS. 1 to 9) and by a so-called "RDL First" manufacturing method (illustrated by FIGS. 13 to 21). FIGS. 31 and 41 each illustrate a cross-sectional view of two embodiments of the front-end module 1 similar in their arrangement to one single level, and obtained respectively by a so-called "Die First" manufacturing method (illustrated by FIGS. 24 to 30) and by a so-called "RDL First" manufacturing method (illustrated by FIGS. 33 to 40-40A). The different embodiments of the front-end module RF according to the invention and implementation of the manufacturing method according to the invention are described sequentially below.

It is first noted that each of the different embodiments illustrated in FIGS. 10, 22, 31 and 41 comprises a radio frequency integrated circuit 11. More specifically, each embodiment of a front-end module RF according to the invention can comprise one or more radio frequency integrated circuits 11, 11', etc., as is in particular illustrated in FIG. 46.

Each radio frequency integrated circuit comprises at least two electrical connection zones 111, 112, including a "signal" connection zone 111 intended to receive a signal, i.e. something other than a fixed voltage, such as the ground or a supply voltage, and a zone for connection to the ground 112. It is through these electrical connection zones 111, 112 that the radio frequency integrated circuit 11 is intended to be connected to another element of the front-end module 1 and/or to an element external to the front-end module 1.

Figure 48A:
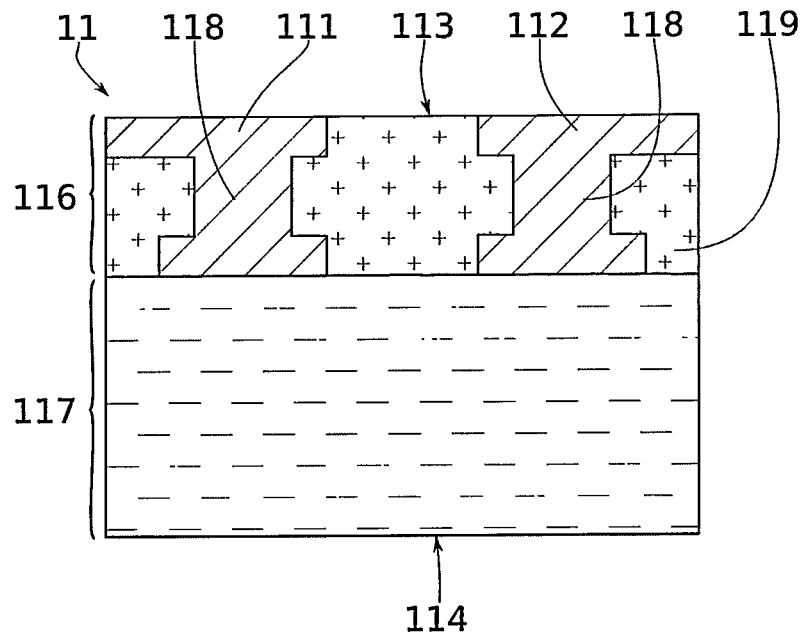
FIG. 48A illustrates a cross-sectional view of a radio frequency integrated circuit comprised in the embodiments of the radio frequency front-end module which are illustrated in FIGS. 10 and 22.
Figure 48B:
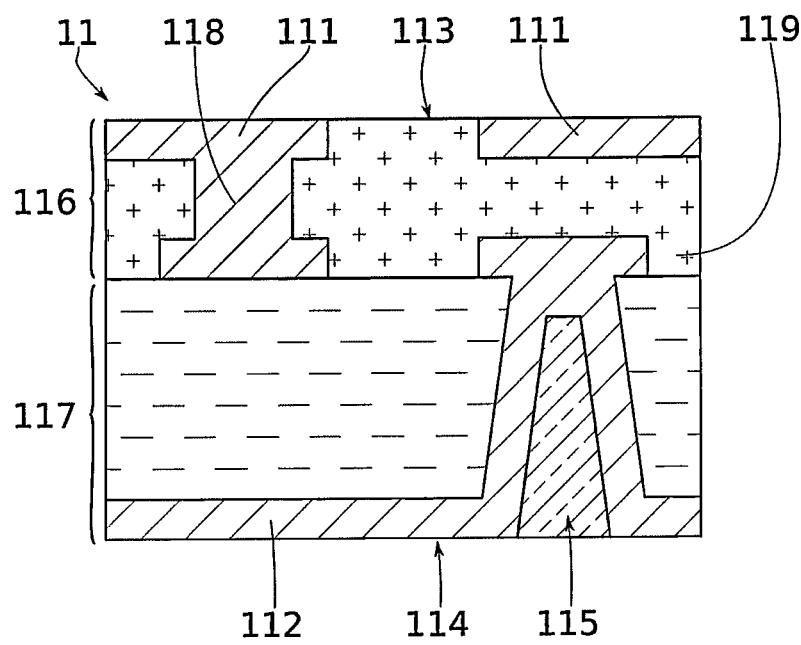
FIG. 48B illustrates a cross-sectional view of the radio frequency integrated circuit comprised in the embodiments of the radio frequency front-end module, which are illustrated in FIGS. 31 and 41.

Simplified diagrams of such radio frequency integrated circuits 11 are illustrated in FIGS. 48A and 48B. In reference to these figures, but in a manner known per se, each radio frequency integrated circuit 11 can comprise two parts 116 and 117 successively superposed to one another from a front side 113 up to a back side 114 of the circuit: a first BEOL part 116 and a second FEOL part 117.

The first BEOL part 116 is composed of at least one metal level, and generally of several metal levels. In FIGS. 48A to 48B, the first part 116 comprises two metal levels, the second metal level being located on the front side 113 of each circuit 11 constituting, if necessary, one or more electrical connection zones, by which the signals enter and exit, and the first metal level ensuring a functional electrical connection with the second FEOL part 117 of the circuit 11. The different metal levels of the first part 116 of each circuit 11 are potentially interconnected with one another by metal vias 118 passing through a dielectric material 119, in particular, an oxide, and for example, an oxide of the semiconductive material with the basis of which the second part 117 of the circuit 11 is constituted. In the first part 116 of each circuit 11, the passive elements (inductances, capacities, etc.) of the circuit 11 can be integrated.

The semiconductive substrate of the second part 117 of each circuit 11 generally comprises the parts of a radio frequency integrated circuit that are called "active", such as transistors (not represented in the simplified diagrams), as well as, in certain technologies such as that illustrated in FIG. 48B, vias 115 through silicon, more known as TSV (Through-Silicon Vias). TSV technology enables, in particular, a metal connection between the first metal level of the first part 116, which is closest to the second part 117, and the back side 114 of the integrated circuit 11. Such metal connections are mainly used for connections to the ground, or to a supply, and optionally for the transmission of signals. That is why, contrary to the case illustrated in FIG. 48A, the zone for connection to the ground 112 is located, in the case illustrated in FIG. 48B, on the back side 114 of the circuit 11. It is noted that the diagrams of FIGS. 48A and 48B are not only simplified, but are further cross-sectional views in a radio frequency integrated circuit 11. In particular, such views can be deceiving, in that the radio frequency integrated circuits generally comprise more than two or three electrical connection zones.

It is also noted that each of the different embodiments illustrated in FIGS. 10, 22, 31 and 41 further comprises a disc 12 with the basis of a self-biased magnetic material, for example with the basis of at least one from among: a ferrite and a hexaferrite. The disc 12 has a first main surface 121 and a second main surface 122 opposite the first main surface 121.

Each of the different embodiments illustrated in FIGS. 10, 22, 31 and 41 also comprises:
- a first dielectric material 16 and a second dielectric material 17, forming a respective side coating layer of the radio frequency integrated circuit 11 and of the disc 12 by maintaining them mechanically in a relative position to each other, and
- a redistribution layer RDL of electrical connections placed above the coating layer comprising said first dielectric material 16; the redistribution layer RDL comprises a metal track for electrically connecting a signal 14 connecting the second main surface 122 of the disc 12 and said first electrical connection zone 111 of the integrated circuit to enable the transmission of an electrical signal between the disc 12 and the integrated circuit 11.

More specifically, each of the different embodiments illustrated in FIGS. 10, 22, 31 and 41 can comprise at least one metal track for connecting the ground 13 and a so-called "signal" metal track for electrically connecting, the metal tracks 13 and 14 being electrically separate from one another, at least within the front-end module 1. Each of the metal tracks 13 and 14 can be made on one or more metal levels of the redistribution layer RDL and/or made on a dedicated level or metal layer, in particular for the track 13 intended to be connected to the ground.

The embodiments illustrated in FIGS. 10 and 22 comprise the abovementioned second dielectric material 17. More specifically, the first dielectric material 16 forms a side coating layer of the radio frequency integrated circuit 11 and the second dielectric material 17 forms a side coating layer of the disc 12.

In the embodiments illustrated in FIGS. 31 and 41, the first dielectric material 16 and the second dielectric material 17 are in fact combined, or in other words, they constitute one same dielectric material (referenced, "16, 17").

Moreover, each of the different embodiments illustrated in FIGS. 10, 22, 31 and 41 is such that the first dielectric material 16 and the second dielectric material 17 maintain mechanically at least the radio frequency integrated circuit 11 and the disc 12 in a relative position to each other, inside the front-end module, in one same assembly obtained by a packaging method using an FOWLP method.

The metal tracks for electrical connection 13, 14 can also be considered as at least partially maintained mechanically by the dielectric material(s) used, in the assembly made to form the front-end module. For example, the metal tracks can have been deposited on one of the dielectric materials, thus serving a deposition support, then covered, if necessary, by one of the dielectric materials, to be encapsulated in the dielectric materials. Furthermore, each of the metal tracks for electrical connection 13, 14 can have a three-dimensional geometry and/or at least two metal levels of electrical connection 141, 142 interconnected with one another by way of metal vias 143 in the redistribution layer RDL. Alternatively, the different levels of electrical connection can be interconnected with one another by a "conformal"-type manufacturing technology, such as one of those known under the reference WLP. Such a manufacturing technology can, in particular, be favoured when the disc 12 has a relatively low thickness, for example a thickness of between 5 and 10 microns. On the contrary, when the disc 12 has a relatively high thickness, a technology for manufacturing different metal levels of electrical connection by vias 143 through a third dielectric material 18 (see, for example, FIGS. 31 and 41) and/or by pillars (see, for example, FIG. 41) can be favoured.

But also, each of the different embodiments illustrated in FIGS. 10, 22, 31 and 41 can be such that:
- a ground metal zone 21 extends over the first main surface 121 of the disc 12; and
- a signal metal zone 22 extends over the second main surface 122 of the disc 12.

It is thus possible that the metal track for electrically connecting the signal 14 connects the second main surface 122 of the disc 12 and said first electrical connection zone 11 of the integrated circuit to enable the transmission of an electrical signal between the disc 12 and the integrated circuit 11, at least by the signal metal zone 22.

Each of the embodiments can thus comprise a magnetic component 20 of the front-end module 1 which can be formed at least by the disc 12 made of a magnetic material, the ground metal zone 21 and the signal metal zone 22. One or more layers can be provided between the disc 12 made of a magnetic material and either of the metal zones 21 and 22.

The magnetic component 20 can constitute of or comprise at least one from among a circulator, a gyrator and an isolator.

Figure 47A:
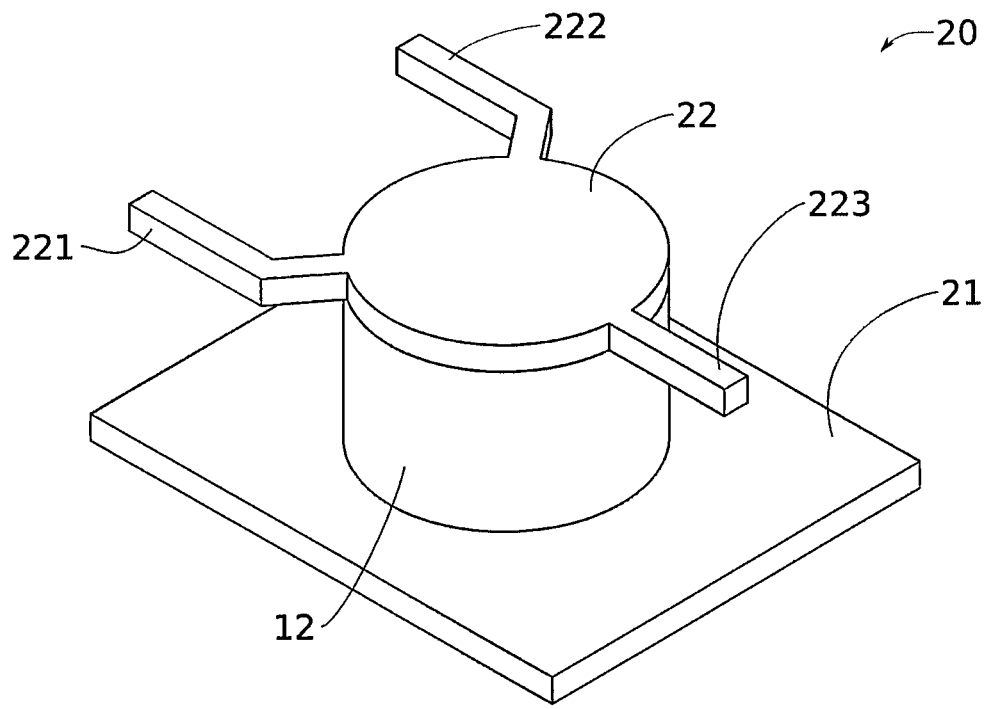
FIGS. 47A and 47B illustrate respectively a perspective view and a top view of an example of a magnetic component, and more specifically, of an example of a circulator, potentially comprised in any one of the different embodiments of the radio frequency front-end module according to the invention, and potentially manufactured according to any one of the different embodiments of the manufacturing method according to the invention.
Figure 47B:
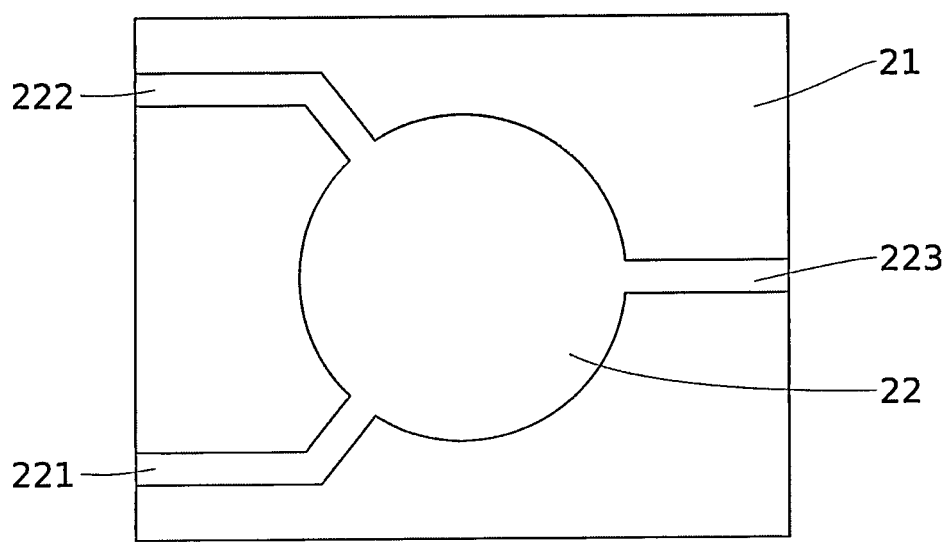

A circulator, as a magnetic component 20, is illustrated in FIGS. 47A and 47B. The different abovementioned elements of a magnetic component 20 integrated in a front-end module 1 according to the invention are referenced here. It is noted that the circulator illustrated comprises three input/output tabs 221, 222 and 223, as is the case ordinarily. At least one of its input/output tabs is intended to be electrically connected to a "signal" electrical connection metal zone of the integrated circuit 11. This "signal" electrical connection is done inside the front-end module 1 according to the invention. This is particularly well illustrated in FIGS. 43 and 45, where it is clearly observed that the tab 221 is connected to the integrated circuit 11 and the tab 222 is connected to the integrated circuit 11'.

Alternatively or complementarily to the above, each of the different embodiments of the front-end module 1 according to the invention can further be such that:
- a first metal track for electrically connecting the ground 13 is in contact with the zone for connection to the ground 112 of the radio frequency integrated circuit 11, this first track 13 being optionally also in contact with the ground metal zone 21 attached to the disc 12 (case of embodiments at one single dielectric material level 16, 17) and
- a second metal track for electrically connecting the signal 14 is in contact with at least one signal electrical connection zone 111 of the radio frequency integrated circuit 11 different from the zone for connection to the ground 112, and is in contact with the signal electrical connection zone 21 attached to the disc 12.

It will be noted that, in the embodiments illustrated in FIGS. 31 and 41, the front-end module 1 is such that the first dielectric material 16 and the second dielectric material 17 extend over one same level 101 of the front-end module 1 by forming a layer, wherein the radio frequency integrated circuit 11 and the disc 12 are integrated, if necessary, the first dielectric material 16 and the second dielectric material 17 being combined with one another. The thickness of the front-end module RF according to these embodiments is thus advantageously reduced. Furthermore, the front-end modules 1 are thus compatible with discs 12 of different thicknesses, thus potentially covering a wide variety of ranges of frequency of application and of power. In addition, the front-end modules 1 thus have a good thermal dissipation which makes them suitable for high-power applications, as the ground plane acts as a good radiator. As will appear in view of the detailed description of the examples of implementation of the manufacturing method of a front-end module RF according to the invention, they are advantageously compatible with an antenna integration according to an FOWLP integration technology and/or according to a three-dimensional integration technology (also known as "3D integration/assembly").

In the embodiments illustrated in FIGS. 10 and 22, the first dielectric material 16 extends over a first level 101 of the front-end module 1 by forming a first layer, wherein the radio frequency integrated circuit 11 is integrated and the second dielectric material 17 extends over a second level 102 of the front-end module 1 by forming a second layer, wherein the disc 12 is integrated. The first layer and the second layer are distinct from one another, and superposed. The first dielectric material 16 and the second dielectric material 17 can be of the same nature or of different natures. The front-end module RF thus offers a great variety of adaptation of the position of the radio frequency integrated circuit 11 relative to the position of the magnetic component 20. Moreover, it is noted in this case that, if the embodiments illustrated in FIGS. 10 and 22 are such that the radio frequency integrated circuit 11 and the magnetic component 20 are not on top of one another, this case can be considered, all the same.

It appears, in view of the above, that the thickness of the disc 12 between its main surfaces 121, 122 can be greater than a thickness of the radio frequency integrated circuit 11 between its front side 113 and its back side 114, in each of the embodiments illustrated in FIGS. 10, 22, 31 and 41. The front-end module 1 according to the invention thus shows one of the main advantages acquired, thanks to its manufacturing method using a FOWLP-type packaging technique. According to this advantage, the thickness of the disc 12, and therefore of the magnetic component 20, is not advantageously constrained by the thickness of the radio frequency integrated circuit 11, and more specifically, by the thickness of the dielectric material layer 16, wherein the radio frequency integrated circuit 11 is integrated. Thus, the disc 12, and therefore the magnetic component 20, can have a thickness greater than the thickness of the radio frequency integrated circuit 11, which is often desired, in particular to achieve a certain power handling of the magnetic component 20 and/or to improve the spectral effectiveness of the front-end module 1.

As will clearly emerge from the description below of different methods for manufacturing a front-end module 1 according to the invention, no adhesive or filling mastic, such as a non-conductive epoxy resin, is necessary, in particular around side walls of the disc 12, to stabilise the performances of the front-end module 1 relative to the frequencies and to the temperatures of its operation or of its use, including under high vibration conditions.

Furthermore, it is not necessary either to use an external magnet (often very bulky) to perform the magnetic function, and in particular, that of a circulator. The magnetic component 20 such as described above being self-biased suffices here.

Below, the different embodiments of the manufacturing method according to the invention are described.

In reference to FIGS. 1 to 9, below an embodiment of a manufacturing method is described, making it possible to obtain the front-end module 1 which is illustrated in FIG. 10.

As illustrated in FIG. 1, a radio frequency integrated circuit 11 and a first carrier substrate 31 are first provided. The first carrier substrate can comprise a temporary bonding layer 310. The radio frequency integrated circuit 11 is transferred, by its front side 113, onto the first carrier substrate 31, and more specifically, onto the temporary bonding layer 310.

Figure 2:
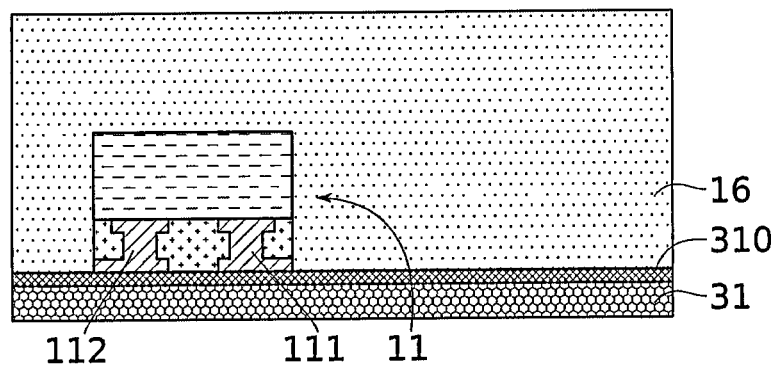
Figure 3A:
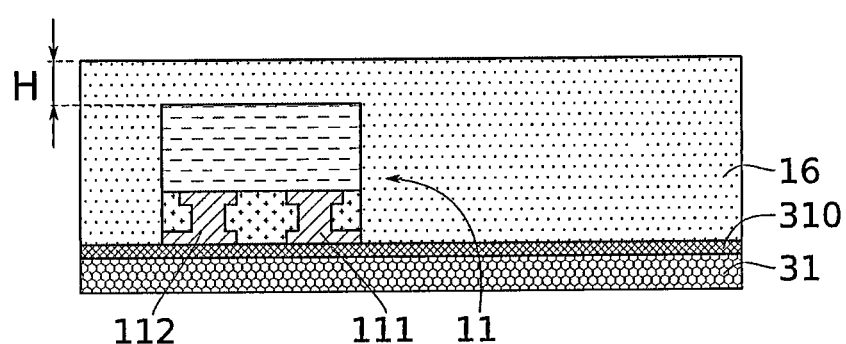
FIGS. 3A and 3B illustrate alternatives of this method.
Figure 3B:
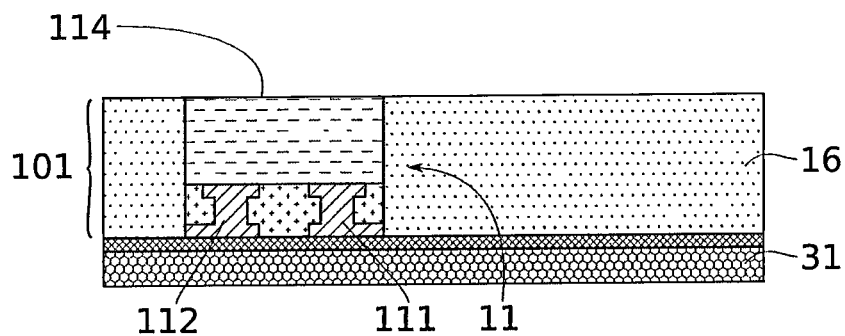

As illustrated in FIG. 2, a first dielectric material 16 is then deposited on the first carrier substrate 31, around, even also above, the radio frequency integrated circuit 11. This deposition can consist of an oxide growth. This step has the effect of freezing the position of the radio frequency integrated circuit 11 in the first dielectric material 16. In the case of an overmoulding, the thickness by which the first dielectric material 16 thus optionally covers the back side 114 of the radio frequency integrated circuit 11 can thus:

be returned, for example by grinding, to a desired thickness H as illustrated in FIG. 3A or, alternatively,
   be grinded until updating the back side 114 of the radio frequency integrated circuit 11, as illustrated in FIG. 3B, even by grinding the radio frequency integrated circuit 11 by its back side 114, without however degrading the functions of the second part 117 of the circuit. This second alternative therefore leads to exposing the radio frequency integrated circuit 11 by its back side 114.

It is noted, that it is possible, in this case, if necessary, to implement a technology known as TMV to enable, for example, a reconnection through the first dielectric material 16.

In this case, it is noted that, if the following FIGS. 4 to 10, reproduce the case illustrated in FIG. 3B, this does clearly not exclude that the description below of a first implementation of the method according to the invention is applicable to the scenario illustrated in FIG. 3A.

Figure 4:
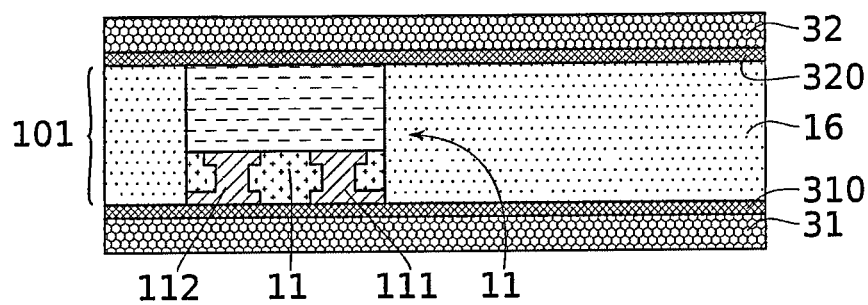
Figure 5:
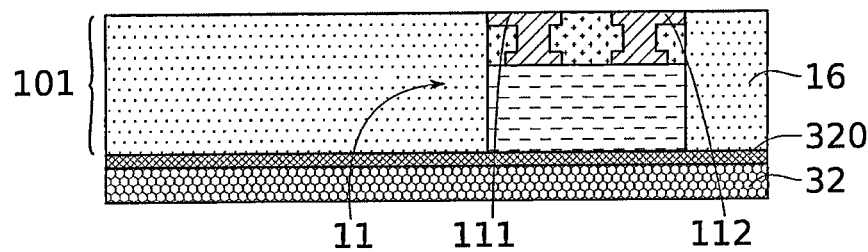

It is then provided to transfer the part already formed of the front-end module 1 from the first carrier substrate 31 until on a second carrier substrate 32. The second carrier substrate can comprise a temporary bonding layer 320. In the alternative illustrated, the second carrier substrate 32 extends, as illustrated in FIG. 4, on the first dielectric material 16 and on the back side 114 of the integrated circuit RF 11. After the removal of the first support substrate 31, for example by unsticking, the integrated circuit 11 rests by its back side 114 on the second carrier substrate 32, its front side 113 having a zone for connection to the ground 112 and a "signal" electrical connection zone 111, different from the zone for connection to the ground 112, which is thus exposed, as illustrated in FIG. 5.

Figure 6:
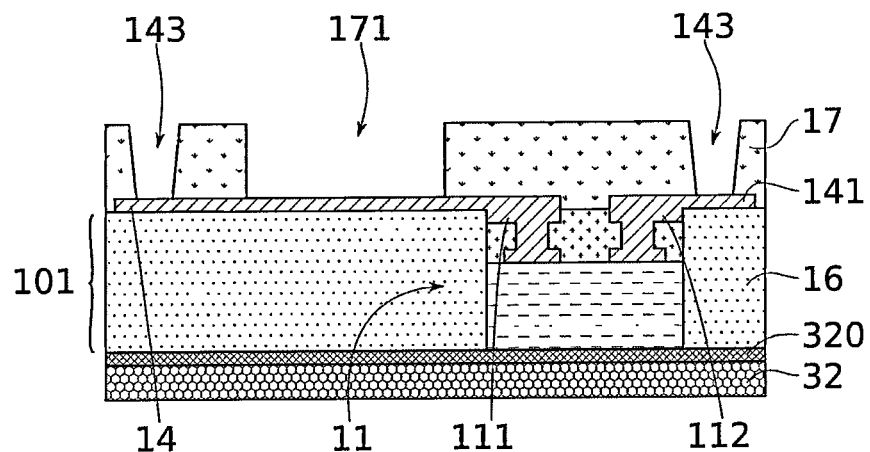

In reference to FIG. 6, the method then comprises the deposition of a first metal level for electrical connection 141, so as to have two parts, electrically separate from one another, each part being intended to constitute a part of one of the two metal tracks for electrical connection 13 and 14 such as described above.

Still in reference to FIG. 6, the method then comprises the deposition of a second dielectric material 17 on the first metal level for electrical connection 141, and potentially over the whole exposed surface of the part of the front-end module already manufactured, then an etching of the second dielectric material 17. This etching step is configured first so as to form a cavity 171 located facing the part of the first metal level 141; the cavity 171 is intended to house the disc 12. The etching step is also configured so as to form vias 143 to a second metal level for electrical connection 142 (see FIG. 7) for each of the two metal tracks for electrical connection 13 and 14.

A transfer of the disc 12 into the formed cavity 171 is then provided. Subsequently, the position of the disc 12 relative to that of the integrated circuit RF 11 is defined and frozen.

The spacing between the disc 12 and the integrated circuit RF 11 is thus controlled and ensured.

Figure 7:
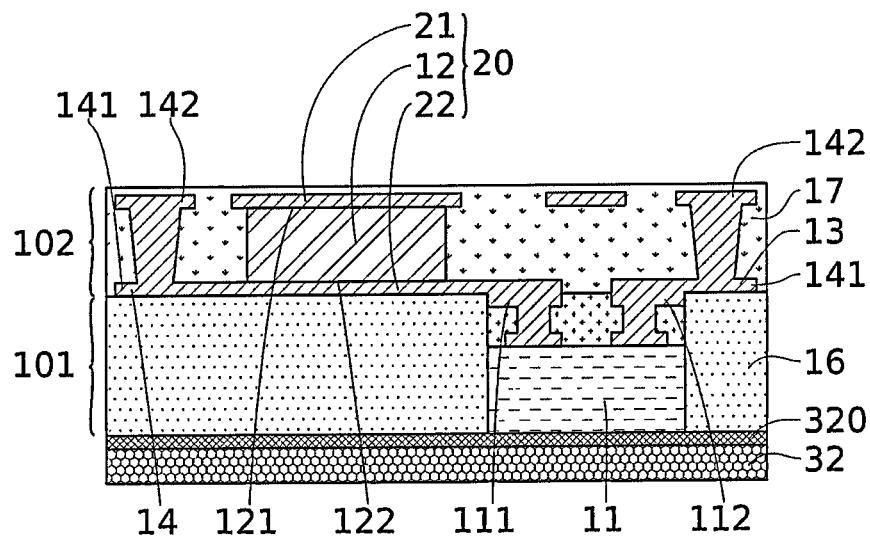
Figure 8:
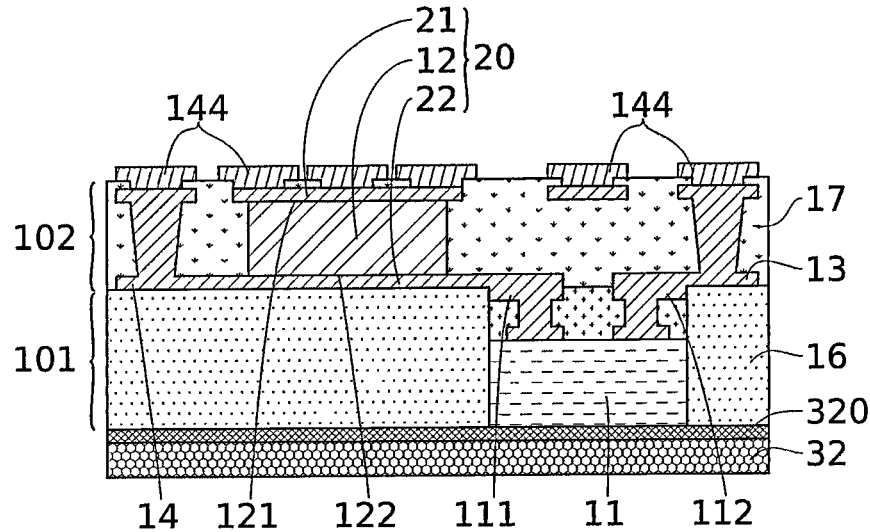

Then, in reference to FIG. 7, a deposition of the second metal level for electrical connection 142 on the surface of the second dielectric material 17 and the exposed main surface of the disc 12 is done, so as to form each of the two metal tracks for electrical connection 13, 14, by filling each formed via 143, for example according to a technique called "conformal layer". This deposition can itself be covered with the second dielectric material 17. It thus appears, from FIG. 7, that the metal material of the disc 12 is inserted between two layers of a redistribution network, more known by RDL (redistribution layer), according to the first approach proposed (see also FIG. 14). It appears therefore that this first approach requiring a minimum of two redistribution layers is compatible with a thick or thin disc, so as to potentially cover a wide range of application in frequency and in power.

This results in the formation of input/output pads 144 of the front-end module 1 on the second metal level for electrical connection 142. This step can require the opening by places, for example by etching, of the second dielectric material 17 optionally covering the second metal level for electrical connection 142. The formation of the pads 144 can be done according to a technology known as UBM (Under Bump Metallurgy).

It must be noted in this case, that a structure with more than two metal levels for electrical connection can be considered. These different metal levels for electrical connection can make it possible to connect to one another, several radio frequency integrated circuits 11 and 11' (according to the electrical diagram of the front-end module to be manufactured), to perform passive functions such as, for example, inductances, transformers, isolators and circulators, and to produce on these, the different input and output pads 144 of the front-end module 1. For a higher integration level, that of an antenna can also be provided by an integration technology comparable to that known as FOWLP (Fan-Out Wafer-Level Packaging), by a three-dimensional integration technology by using vias through the dielectric material (TMV technology) and top plating options.

The different pads 144 can be dedicated to radio frequency signals, to control signals, to test signals or to connections to the ground or to a supply. It must be noted, in reference to FIGS. 7 and 8, that the formation of the pads 144 can require a prior step of opening the second dielectric material 17 at the reconnections that the metal levels for electrical connection must constitute, and in particular, the metal level for electrical connection located farther from the second carrier substrate 32. The formation of the pads can, if necessary, incorporate the deposition of a so-called UBM (Under Bump Metallurgy) metal layer. Each pad is thus capable of receiving a solder bump 145, for example with the basis of a tin and silver alloy, as illustrated in FIG. 9. Alternatively to the tin balls or copper pillars 145, paste to be soldered can be deposited on the pads 144. The two technologies respectively known as BGA (Ball Grid Array) and as LGA (Land Grid Array) can be used alternatively from one another.

Then, the removal, for example by unsticking, from the second carrier substrate 32 makes it possible to obtain the front-end module 1 such as illustrated in FIG. 10. The front-end module 1 is thus manufactured and ready to be assembled to the other components of a radio frequency system potentially embedding several front-end modules 1 according to the invention. Prior to such an assembly, the front-end module 1 such as illustrated in FIG. 10 can be assembled on an evaluation board 4 of the module 1, for example, as illustrated in FIG. 11.

Figure 11:
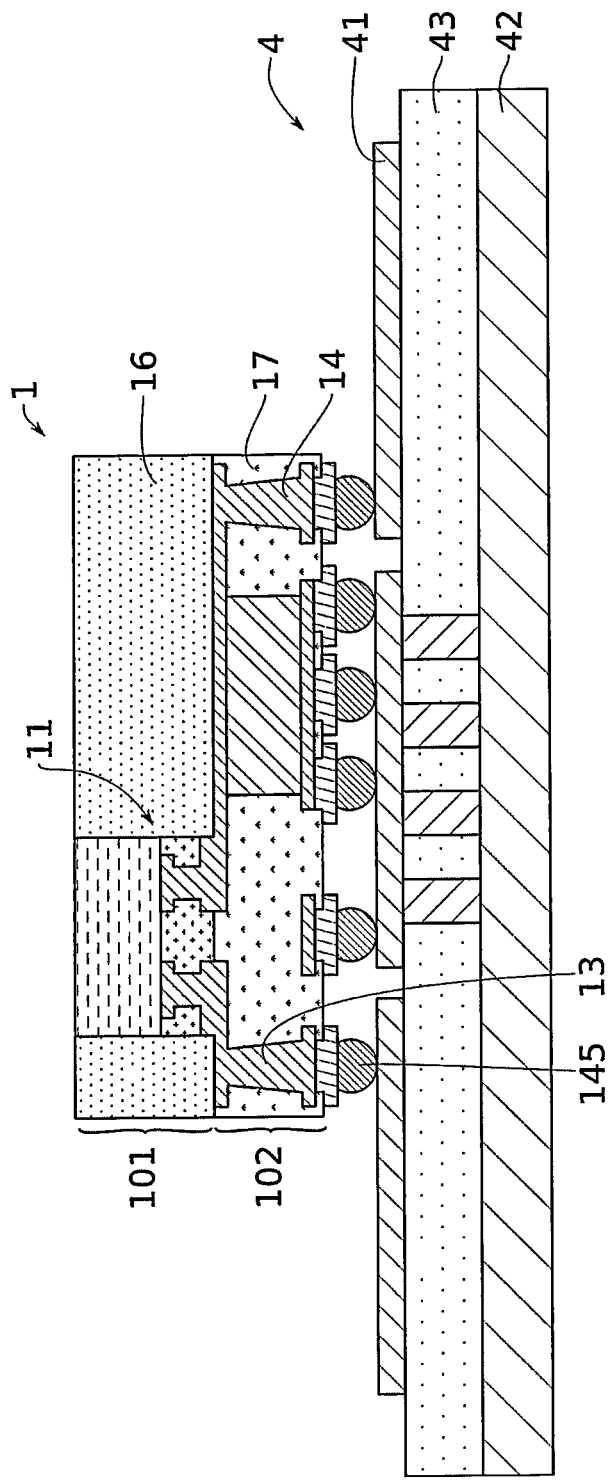
FIG. 11 illustrates a cross-sectional view of a mounting, on an evaluation board, of the radio frequency front-end module illustrated in FIG. 10.

In reference to FIG. 11, each pad 144 can thus, if necessary, by way of a solder ball 145 which is associated with it, be put into contact with pads 41 of an evaluation board 4 of the front-end module 1, the evaluation board 4 further comprising, opposite its pads 41, a ground plane 42. The connection of the metal ground plane 42 of the evaluation board 4 can be made via a conductive adhesive or by soldering to a tin and silver alloy, for example, of the LGA type.

The embodiment described above of the method according to the invention notes, as mentioned above, a first approach which results in an arrangement of the radio frequency integrated circuit 11 and of the magnetic component 20 on different levels from one another of the front-end module.

Another embodiment of the method for manufacturing a front-end module 1 according to the invention is described below in reference to FIGS. 12 to 22. It notes the same approach, and results in one same arrangement by levels of the radio frequency integrated circuit 11 and of the magnetic component 20.

Figure 12:
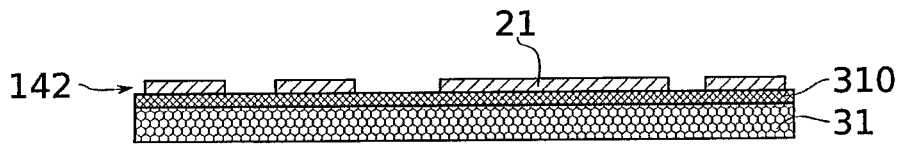

As illustrated in FIG. 12, a metal level for electrical connection 142 on the first carrier substrate 31 is first deposited, so as to have at least two parts electrically separate from one another, each constituting a part of the redistribution layer RDL, or a part of one of the two metal tracks for electrical connection 13, 14.

Figure 13:
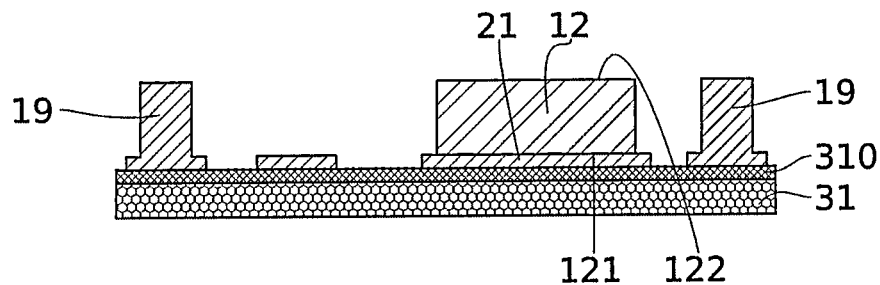

Then, as illustrated in FIG. 13, the disc 12 made of a magnetic material is transferred onto a part of the first metal level 141 constituting a part of the redistribution layer RDL, and more specifically, a part of the first metal track for electrical connection 13, that intended to be connected to the ground.

The formation of at least one metal pillar for electrical connection 19 is then provided. A pillar 19 is more specifically formed on each of the two parts electrically separate from one another from the first metal level 141. Each of these two parts constitutes a part of one of the two metal tracks for electrical connection 13 and 14. It is noted that each metal pillar 19 preferably has a height greater than a thickness of the disc 12 between its main surfaces 121 and 122. The pillars 19 can be either formed moreover, then transferred, for example by a machine of the "pick-and-place" type, whether this is before or after the transfer of the disc 12, or can be formed by ordinary microelectronic deposition(s) and etching(s), preferably before the transfer of the disc 12.

From the two preceding steps, a part of the front-end module 1 such as illustrated in FIG. 13 is obtained.

Figure 14:
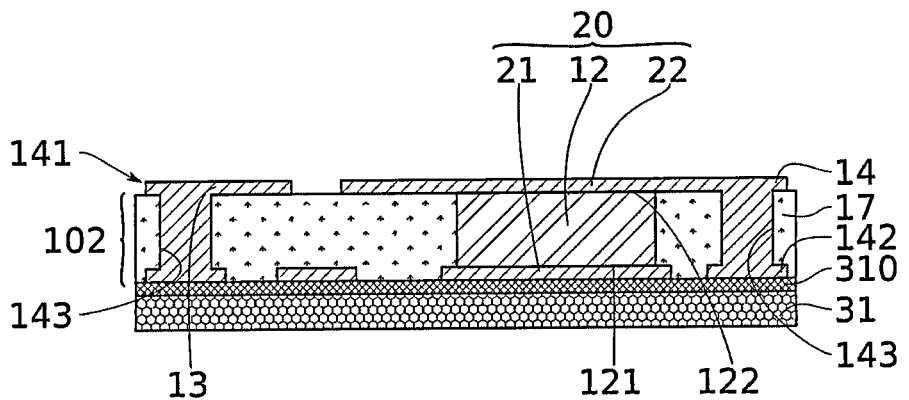

In reference to FIG. 14, a deposition of the second dielectric material 17 on the metal level for electrical connection 142 and at least around the disc 12 is then done. Subsequently, the position of the disc 12 within the second dielectric material 17 is defined and frozen. It already appears that the metal material of the disc 12 is inserted between two redistribution layers or RDL. In the case of an overmoulding, the thickness by which the second dielectric material 17 thus optionally covers the main surface 122 of the disc 12 can thus be grinded until updating the main surface 122 of the disc 12. Preferably, each metal pillar 19 has a height greater than the thickness of the disc 12 between its main surfaces. In this way, the top of each pillar is exposed by the abovementioned grinding step.

Then, still in reference to FIG. 14, a deposition of another metal level for electrical connection 141 on the second dielectric material 17 is done on an exposed main surface 122 of the disc 12 and the top of each metal pillar 19, so as to form the redistribution layer RDL or each of the two metal tracks for electrical connection 13 and 14.

Figure 15:
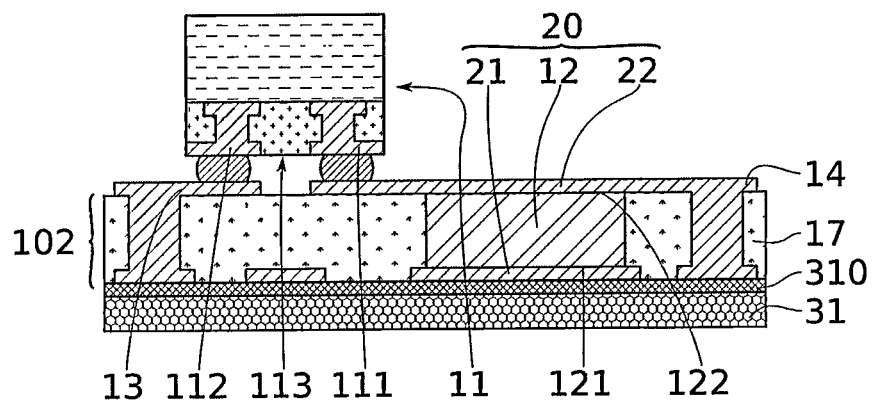

Then, as illustrated in FIG. 15, a transfer of the radio frequency integrated circuit 11 by its front side 113 on the metal level for electrical connection 141 is done, so as to electrically contact each of the two metal tracks for electrical connection 13 and 14. If necessary, each contact can be made via a solder ball or a copper pillar.

Figure 16:
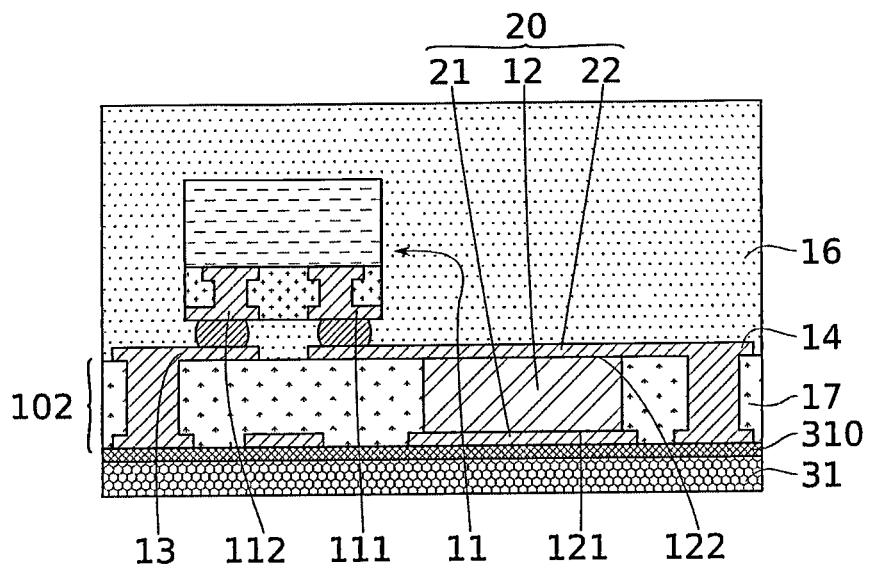

As illustrated in FIG. 16, this results in a deposition of the first dielectric material 16 on the metal level for electrical connection 141 at least around the radio frequency integrated circuit 11. Subsequently, the position of the radio frequency integrated circuit 11 is determined and frozen relative to that of the disc 12.

Figure 17A:
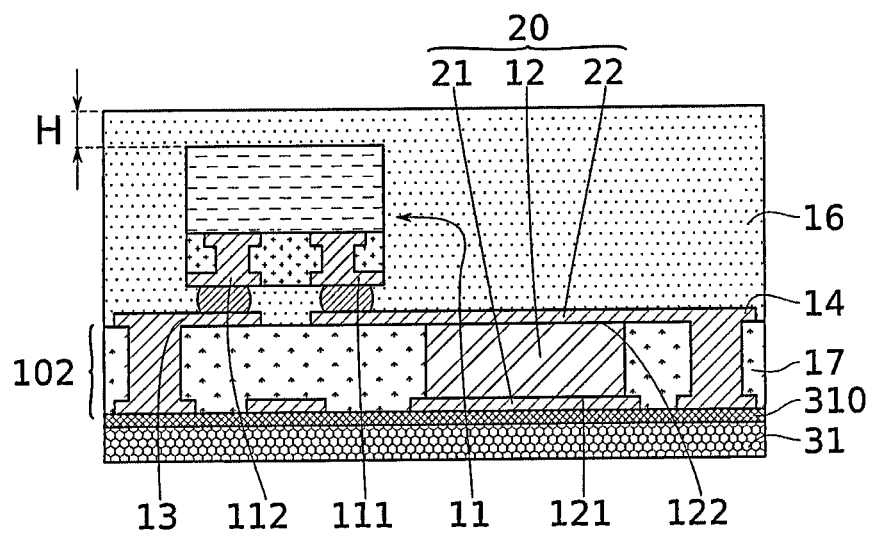
FIGS. 17A and 17B illustrate alternatives of this method.
Figure 17B:
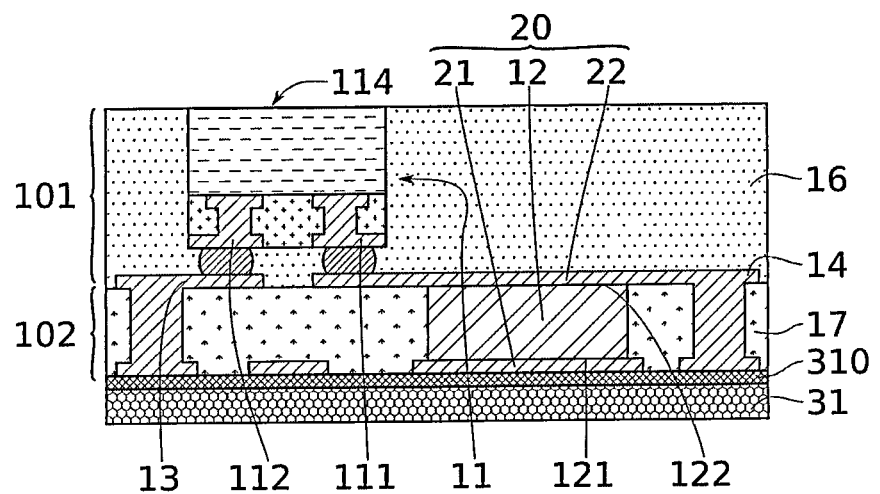

A first part of the front-end module is thus obtained, as illustrated in FIGS. 17A and 17B, on the first carrier substrate 31. In the same way as above, according to an optional grinding depth of the exposed surface of the first part of the front-end module, either a thickness H of the first dielectric material 16 subsists above the radio frequency integrated circuit 11 (see FIG. 17A), or the back side 114 of the radio frequency integrated circuit 11 is exposed (see FIG. 17B).

Figure 18:
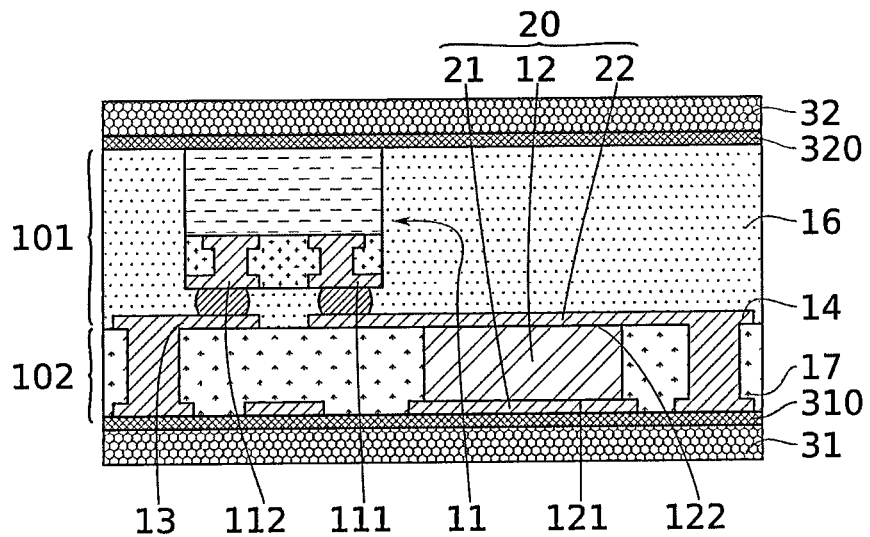
Figure 19:
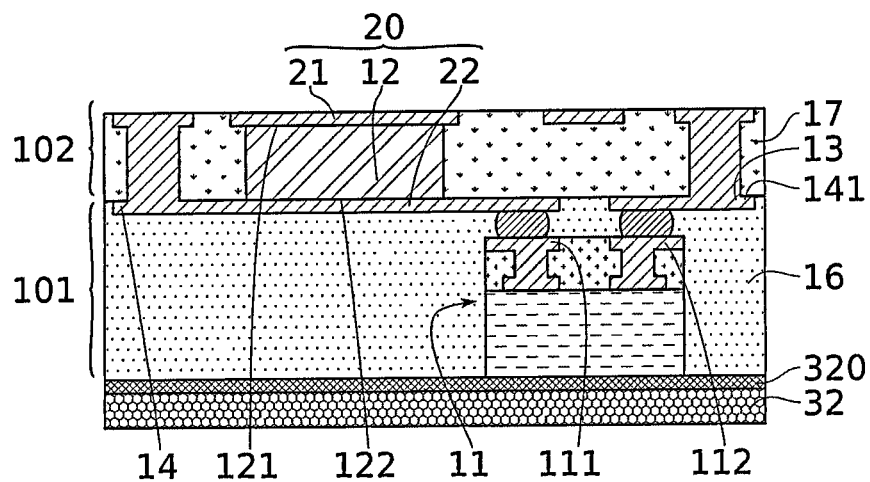

Whatever the alternative chosen, a transfer, such as illustrated in FIGS. 18 and 19, of the first part of the front-end module from the first carrier substrate 31 on the second carrier substrate 32 by the exposed side of the first part of the front-end module is then done such that the first part of the front-end module can be treated from its other side, to finish forming the front-end module 1.

As illustrated in FIG. 20, and in the same way as described above (in reference to FIG. 8), a formation of input/output pads 144 of the front-end module 1 is done on the first metal level for electrical connection 141.

Subsequently, it suffices to add, as illustrated in FIG. 21, optionally solder balls or copper pillars on each of the input/output pads 144, and to remove, for example by unsticking, the second carrier substrate 32, to obtain the front-end module 1 such as illustrated in FIG. 22.

Figure 23:
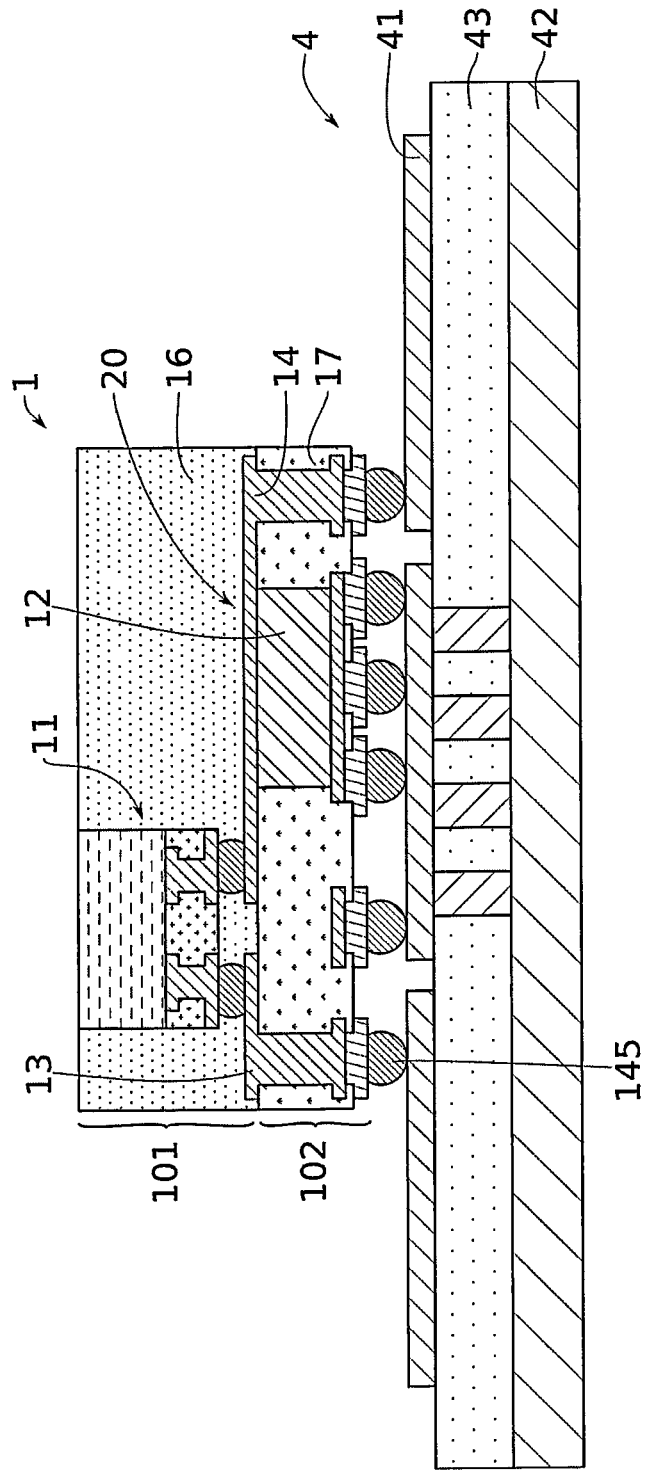
FIG. 23 illustrates a cross-sectional view of a mounting, on an evaluation board, of the radio frequency front-end module illustrated in FIG. 22.

In the same way discussed above in reference to FIG. 11, the front-end module 1 is thus manufactured and ready to be assembled to the other components of a radio frequency system or on an evaluation board 4 of the module 1, for example as illustrated in FIG. 23.

To distinguish the two embodiments of the method which are described above, one in reference to FIGS. 1 to 11 and the other in reference to FIGS. 12 to 21, and although these two embodiments fall under one same approach, it is noted that the first of the two embodiments consists of first transferring the radio frequency integrated circuit 11 by its front side 113 onto a first carrier substrate 31, while the second of the two embodiments first consists of designing parts of the package intended to maintain in a relative position, and functionally (through their electrical connections), the radio frequency integrated circuit 11 and the magnetic component 20. Thus, the first embodiment of the method according to the invention described above can be qualified as a "die first/side down" embodiment, and the second embodiment of the method according to the invention described above can be qualified as an "RDL First" embodiment.

It must be noted that front-end modules 1 according to the invention manufactured according to the two embodiments of the method according to the invention described above has a satisfactory thermal dissipation capacity, which makes this solution suitable for high-power applications. However, as the disc 12 is thicker, as the thickness of the package increases proportionally, the thermal dissipation paths can be degraded. In addition, the total thickness of the package is high and mainly determined by the sum of the thickness of the radio frequency integrated circuit 11 and of the disc 12, this thickness also being increased if the bonding of the front-end module 1 to other elements of a radio frequency system or to an evaluation board 4 can incorporate connections by electrical wires (or "wire bonding"). Thus, in the case where the application would require being able to dissipate the heat emitted, the other examples of embodiments will be preferred, wherein the integrated circuit and the disc are in one same dielectric layer.

As mentioned above, a second approach is also proposed which makes it possible to result in that the radio frequency integrated circuit 11 and the magnetic component 20 are both located in one same level 101 of the front-end module 1. This second approach comes in two embodiments of the manufacturing method according to the invention an embodiment of which called third embodiment is described below in reference to FIGS. 24 to 31 and the other embodiment called fourth embodiment is described below in reference to FIGS. 33 to 41.

Figure 24:
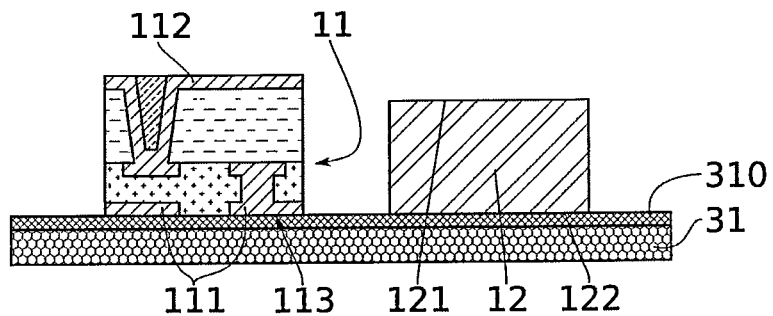
FIGS. 24 to 30 illustrate different steps of a third embodiment, called "Die First", of a method for manufacturing a radio frequency front-end module according to a third embodiment, which is illustrated in FIG. 31.

As illustrated in FIG. 24, the third embodiment of the manufacturing method according to the invention first comprises a transfer of the radio frequency integrated circuit 11 and of the disc 12 on the first carrier substrate 31. More specifically, the radio frequency integrated circuit 11 is transferred onto the first carrier substrate by its front side 113 and the disc 12 is transferred onto the first carrier substrate by one of its first and second main surfaces 121, 122.

In this case, it is noted that, in the example illustrated in FIG. 24, the integrated circuit 11 has a structure such as illustrated in FIG. 48B which has already been described above.

Figure 25:
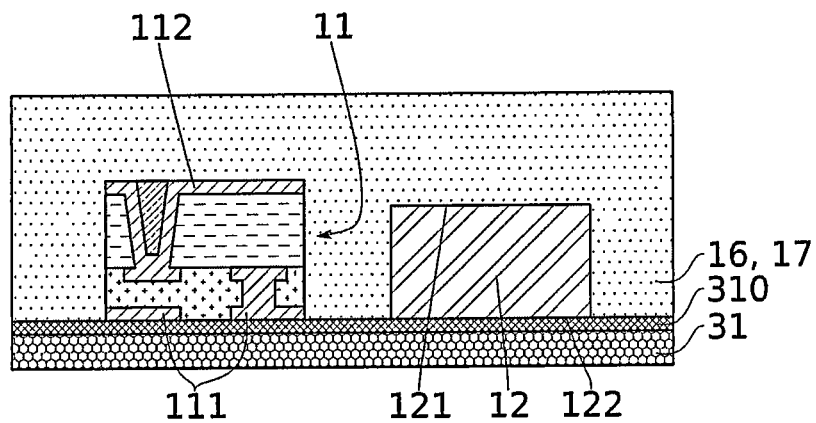
Figure 26:
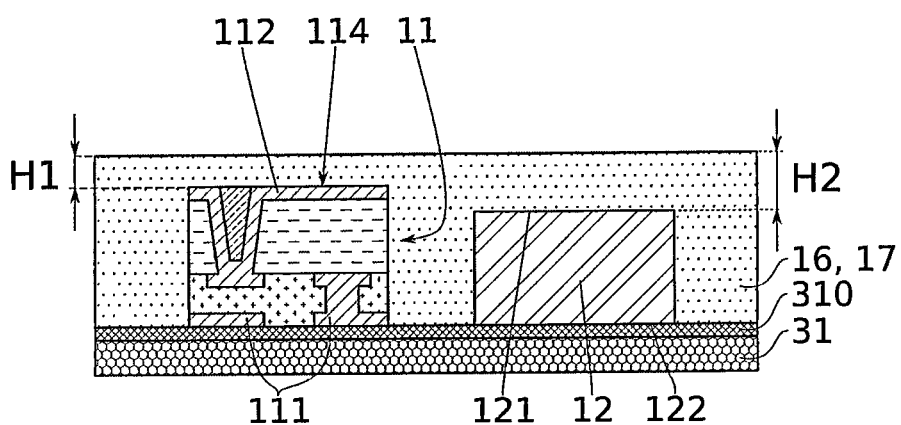

This results in, as illustrated in FIG. 25, a deposition of the first dielectric material 16 on the first carrier substrate 31 at least around the radio frequency integrated circuit 11 and of the disc 12. Subsequently, the radio frequency integrated circuit 11 and the disc 12 are maintained in relative position to each other. In the case of an overmoulding, a grinding step can be provided so as to return the thickness of the first dielectric material 16 at a value H1 above the radio frequency integrated circuit 11 and at a value H2 above the disc 12, according to the relative thicknesses of the radio frequency integrated circuit 11 and of the disc 12 to one another. Alternatively, either of the values H1 and H2 can be brought to zero, thus exposing either from among the back side 114 of the radio frequency integrated circuit 11 and the main surface 121 of the disc 12 opposite that by which the disc 12 has been transferred onto the first carrier substrate 31.

It is thus understood that, according to the scenario, a grinding of the first dielectric material 16 can be provided to expose the back side 114 of the radio frequency integrated circuit 11 and/or the main surface of the disc 12 opposite that by which the disc 12 has been transferred onto the first carrier substrate 31.

Figure 27:
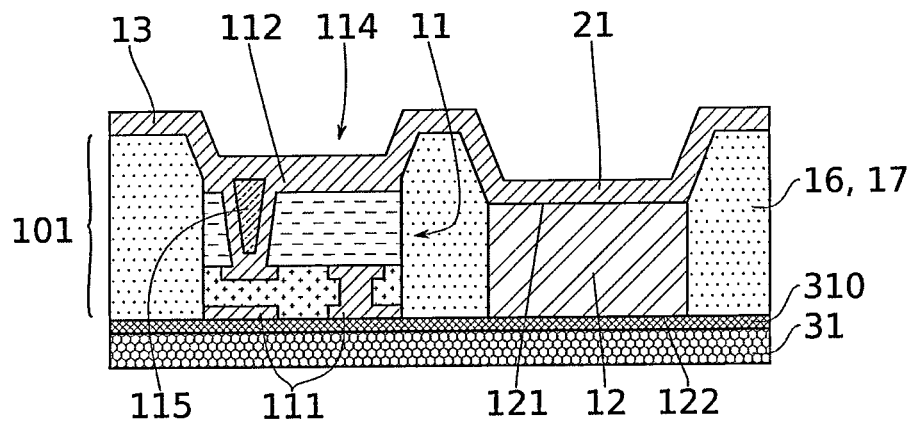

Once exposed, the back side 114 of the radio frequency integrated circuit 11 and/or the main surface of the disc 12 opposite that by which the disc 12 has been transferred onto the first carrier substrate 31, a deposition of the first metal track for electrical connection 13, is done, to obtain, on the first carrier substrate 31, a first part of the front-end module, in the way illustrated in FIG. 27. It will be noted that the metal track for electrical connection 13 connects to one another the first main surface 121 of the disc 12 and the back side 114 of the radio frequency integrated circuit 11, this back side 114 thus serving as a connection to the ground of the radio frequency integrated circuit 11, which, as a reminder, comprises a via 115 for this purpose.

Figure 28:
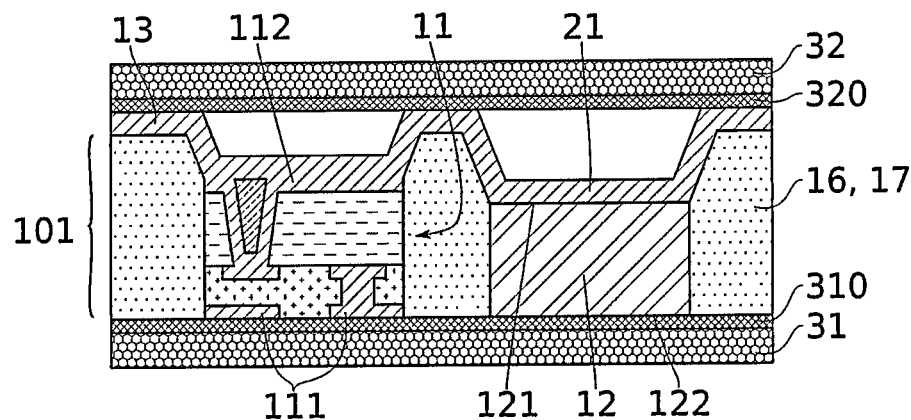
Figure 29:
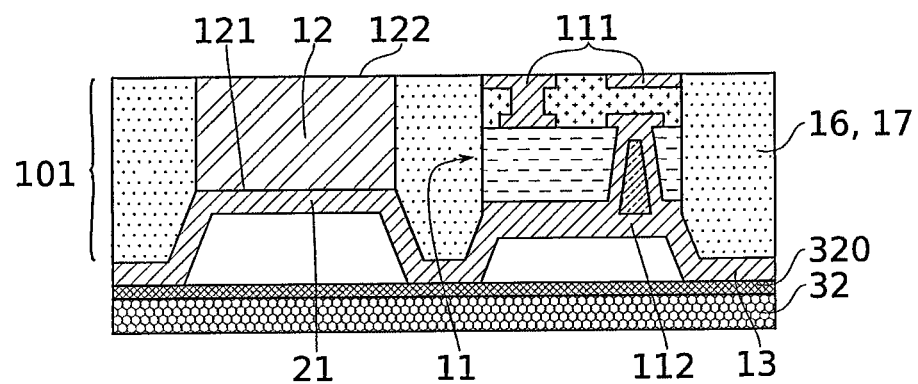
Figure 30:
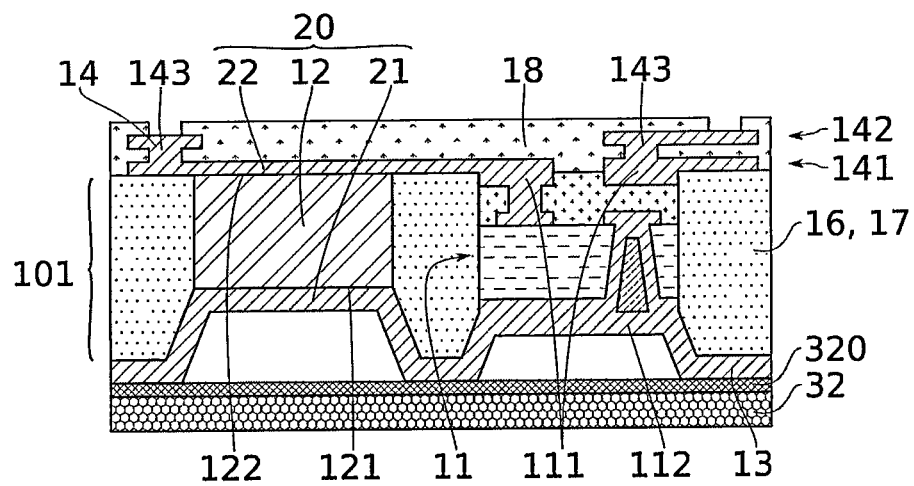

A transfer of the first part of the front-end module from the first carrier substrate 31 onto the second carrier substrate 32 by the side of the first part of the front-end module on which the first metal track for electrical connection 13 is exposed, is then done as illustrated in FIGS. 28 and 29.

In this way, the first part of the front-end module can be treated from its exposed surface after its transfer, to finish forming the front-end module 1.

According to the third embodiment of the manufacturing method considered in this case, the finalisation of the front-end module 1 such as illustrated in FIG. 31, comprises the formation of the second metal track for electrical connection 14 on the exposed surface of the first part of the front-end module after its transfer. In reference to FIG. 30, the second metal track for electrical connection 14 is formed in a redistribution layer RDL comprising, in this example, two metal levels for electrical connection 141 and 142 interconnected with one another by way of metal vias 143 through a third dielectric material 18.

After removal of the second carrier substrate 32, the front-end module 1 is obtained, such as illustrated in FIG. 31.

Figure 32:
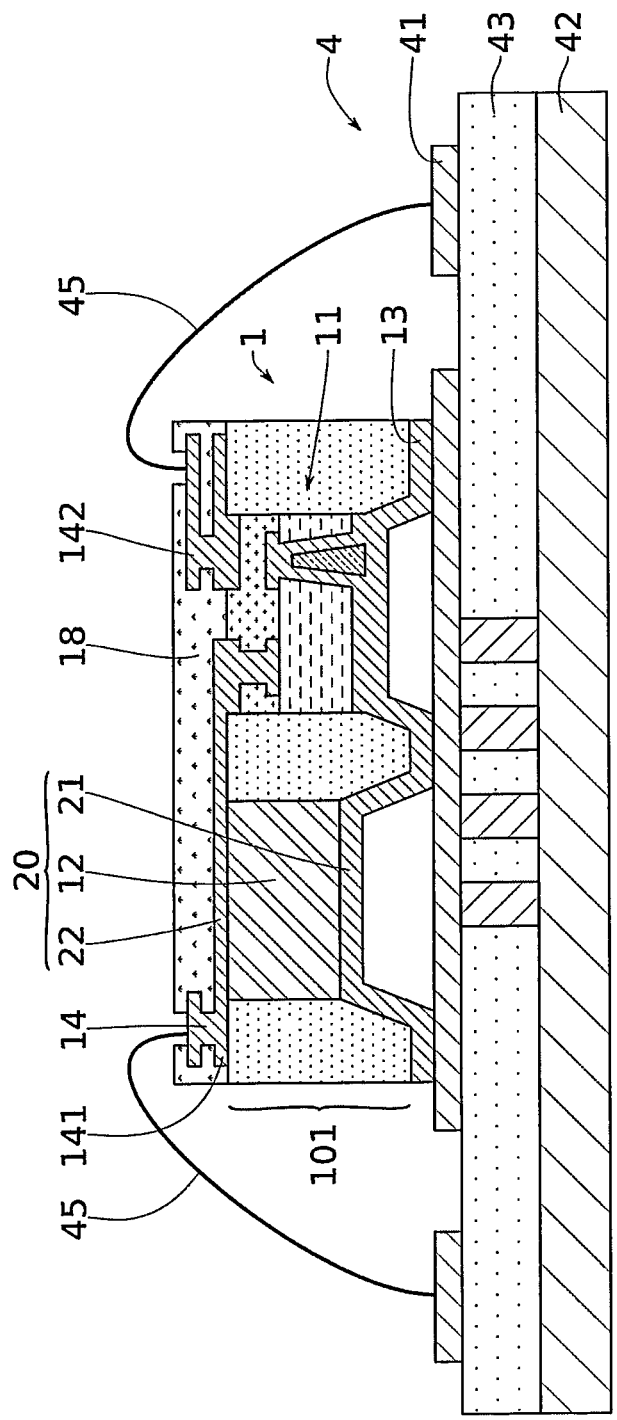
FIG. 32 illustrates a cross-sectional view of a mounting, on an evaluation board, of the radio frequency front-end module illustrated in FIG. 31.

In the same way as discussed above in reference to FIGS. 11 and 23, the front-end module 1 is thus manufactured and ready to be assembled to the other components of a radio frequency system or on an evaluation board 4 of the module 1, for example as illustrated in FIG. 32. In this case, it is noted that, contrary to the assemblies illustrated in FIGS. 11 and 23, the assembly such as illustrated in FIG. 32 incorporates two connections by electrical wire bonding 45. More specifically, the connection of the inputs/outputs of the front-end module 1 on the evaluation board 3 is done by electrical wire bonding 45.

The fourth embodiment of the manufacturing method according to the invention is described below in reference to FIGS. 33 to 41.

Figure 33:
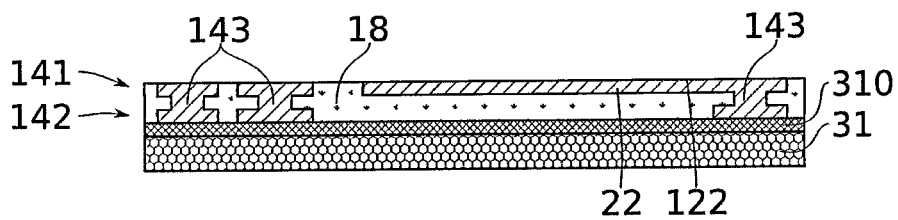
FIGS. 33 to 40A illustrate different steps of a fourth embodiment, called "RDL (redistribution layer) First", of a method for manufacturing a radio frequency front-end module according to a fourth embodiment, which is illustrated in FIG. 41.

In reference to FIG. 33, the fourth embodiment first comprises the formation of a redistribution layer RDL comprising, in this example, two metal levels for electrical connection 141 and 142 interconnected to one another by way of metal vias 143 through a third dielectric material 18. This RDL network comprises one of the two metal tracks for electrical connection, namely the "signal" track 14.

Figure 34:
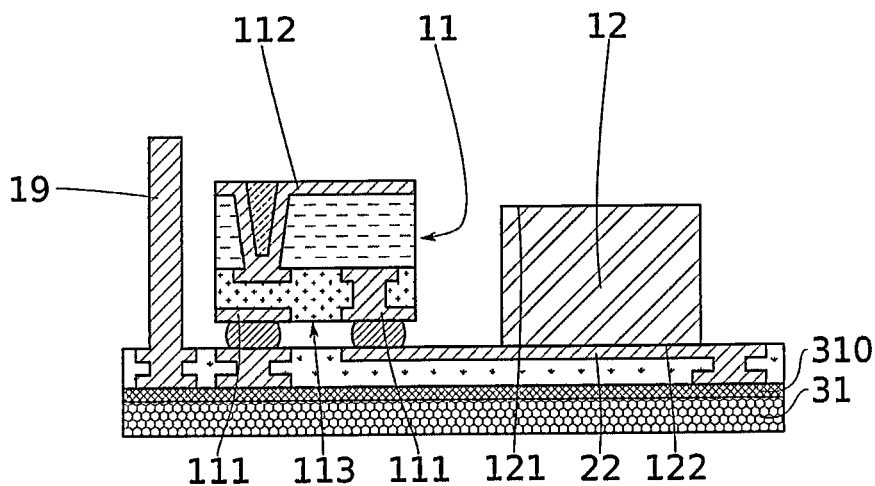

This results in, as illustrated in FIG. 34, the transfer of the radio frequency integrated circuit 11 and of the disc 12 onto the first carrier substrate 31. More specifically, the radio frequency integrated circuit 11 is transferred onto the first carrier substrate 31 by its front side 113 and the disc 12 is transferred onto the first carrier substrate by one of its first and second main surfaces 121, 122.

In this case, it is noted that, as in the example illustrated in FIG. 24, the integrated circuit 11 has, in FIG. 34, a structure such as illustrated in FIG. 48B which has already been described above.

Still in reference to FIG. 34, a metal pillar for electrical connection 19 is then formed on a metal track of the redistribution layer RDL. The pillar 19 has a height greater than the greatest from among a thickness of the radio frequency integrated circuit 11 between its front side 113 and its back side 114 and a thickness of the disc 12 between its main surfaces 121 and 122. The height of each pillar 19 can, for example, be, as the case may be, between 50 and 200 microns.

Figure 35:
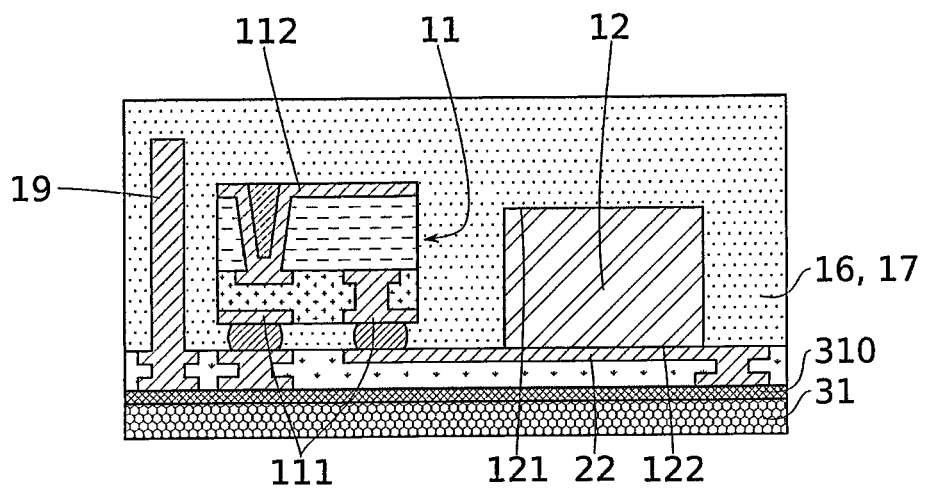
Figure 36:
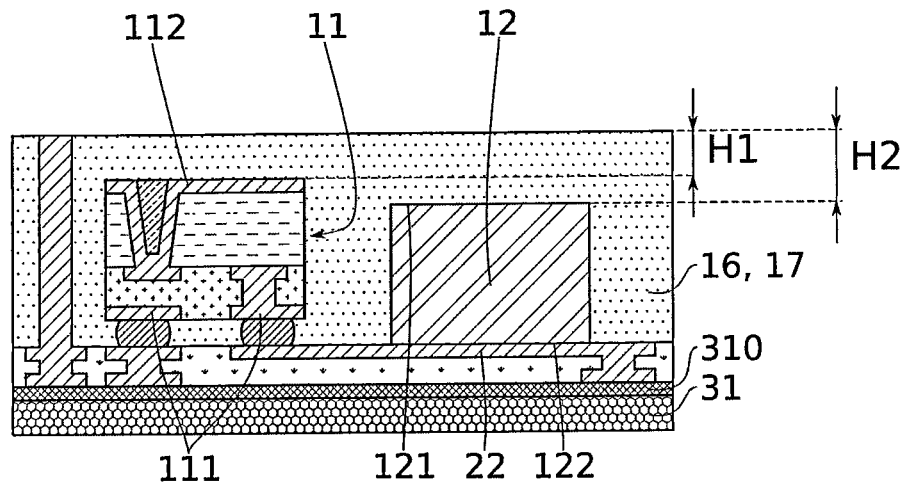

As illustrated in FIG. 35, this results in a deposition of the first dielectric material 16 on the first carrier substrate 31 at least around the radio frequency integrated circuit 11 and of the disc 12, and around the pillar 19, and, if necessary, until covering the assembly.

Still in the controlling of the thicknesses H1 and H2 already discussed above and such as illustrated in FIG. 36, a grinding step can be carried out, which can target, if necessary, exposing the top of the pillar 19.

It is understood that, according to the scenario, a grinding of the first dielectric material 16 can be provided to expose the back side 114 of the radio frequency integrated circuit 11 and/or the main surface of the disc 12 opposite that by which the disc 12 has been transferred onto the first carrier substrate 31. For example, in FIG. 37A, a case is illustrated, wherein the disc 12 has a thickness greater than that of the radio frequency integrated circuit 11, and wherein the abovementioned grinding step has led to exposing the main surface 121 of the disc 12, if necessary, in addition to the top of the pillar 19. The fourth embodiment presently described therefore shows its potential to consider all shapes and dimensions of the disc 12, in particular relative to that/those of the radio frequency integrated circuit 11.

Figure 37:
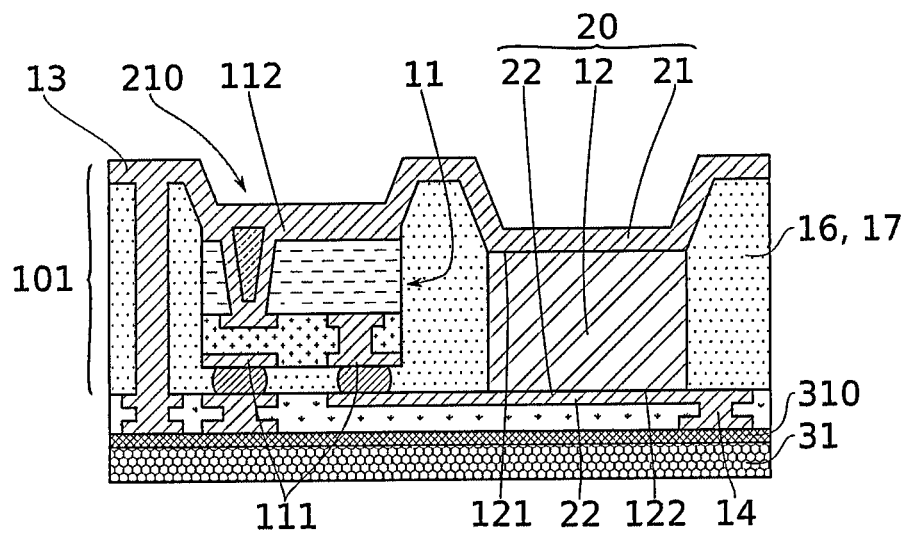
Figure 37A:
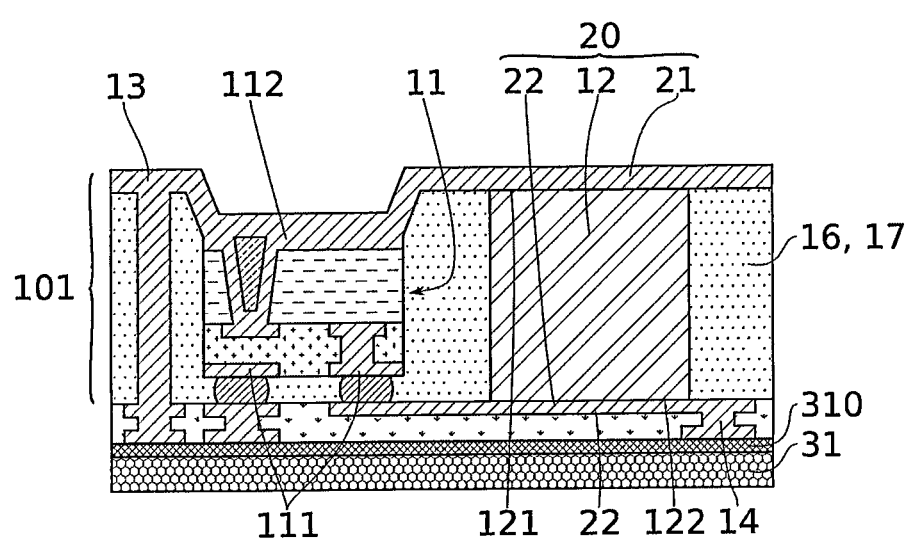

Once exposed, the back side 114 of the radio frequency integrated circuit 11 and the main surface 121 of the disc 12, a deposition of at least one part of the metal track for electrical connection 13 is done, to obtain, on the first carrier substrate 31, a first part of the front-end module, as illustrated in either of FIGS. 37 and 37A.

Figure 38:
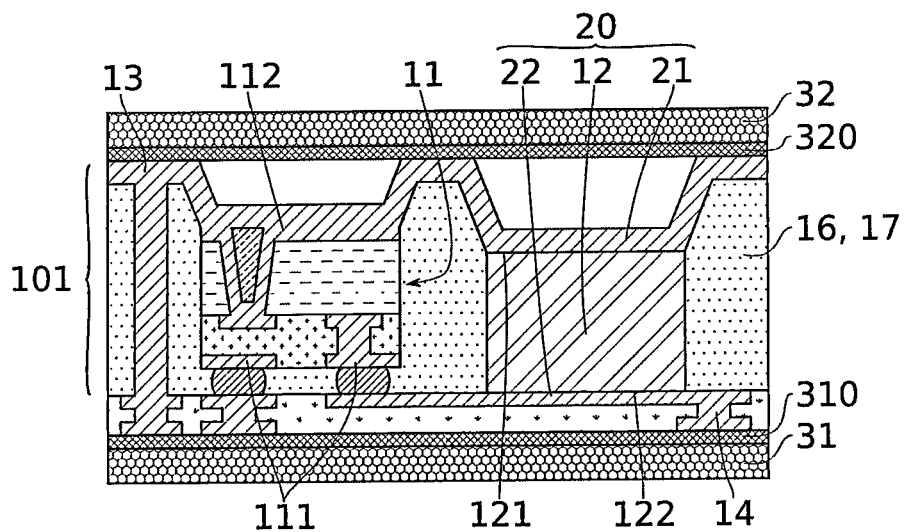

FIG. 38 revisits the case illustrated in FIG. 37, without prejudice of an option to adapt the steps described below in the case illustrated in FIG. 37A. Such adapted steps are moreover illustrated in FIGS. 38A and 40A.

Figure 39:
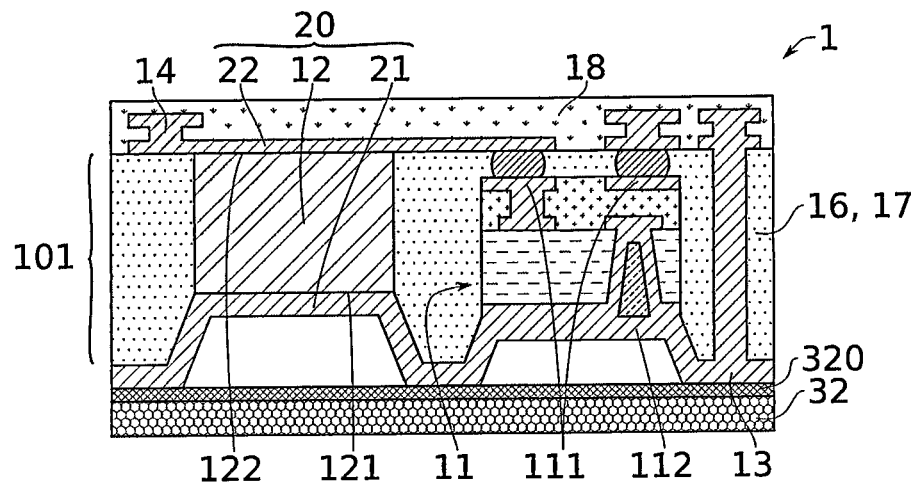
Figure 40:
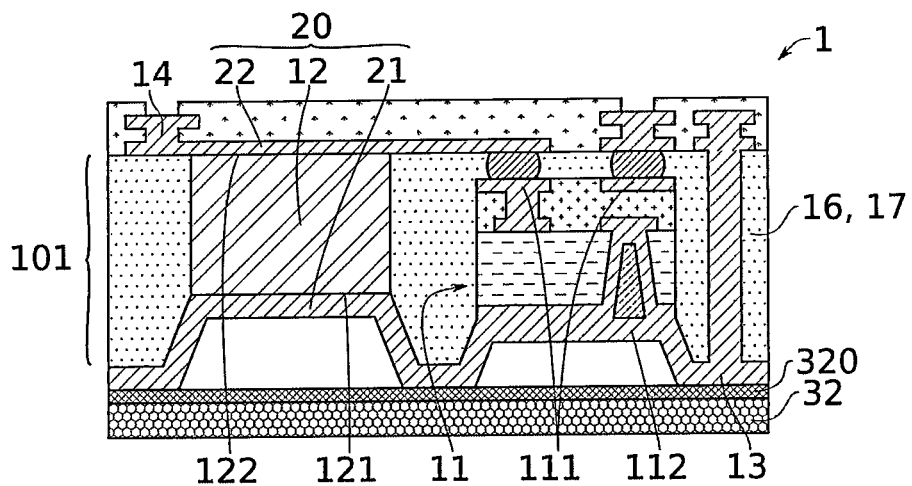

In FIGS. 38 and 39, the transfer of the first part of the front-end module from the first carrier substrate 31 onto the second carrier substrate 32 is illustrated. It is subsequently possible to finalise, as represented in FIGS. 39 and 40, the front-end module 1 by forming input/output reconnection zones of the front-end module 1 on the metal level for electrical connection 142. This step can be carried out by opening by places, for example by etching, a top layer of the third dielectric material 18. Input/output pads can, if necessary, cover said reconnection zones.

Figure 38A:
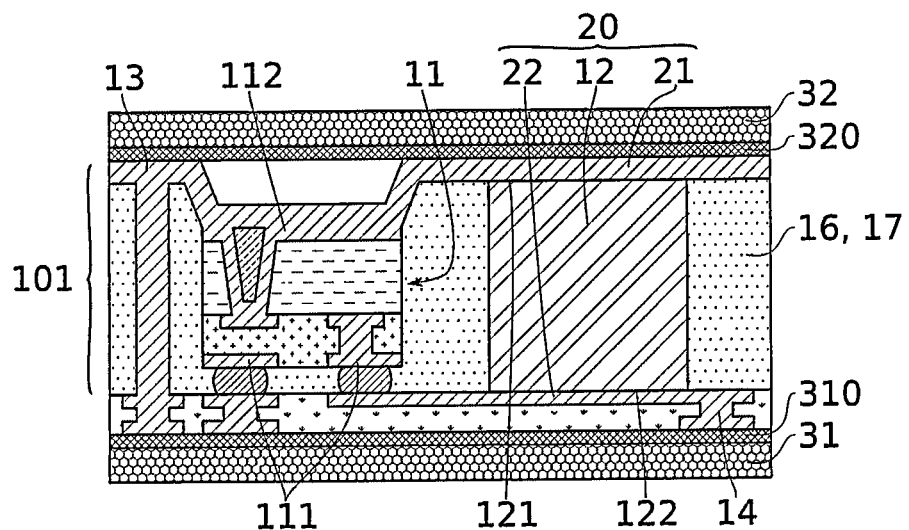
Figure 40A:
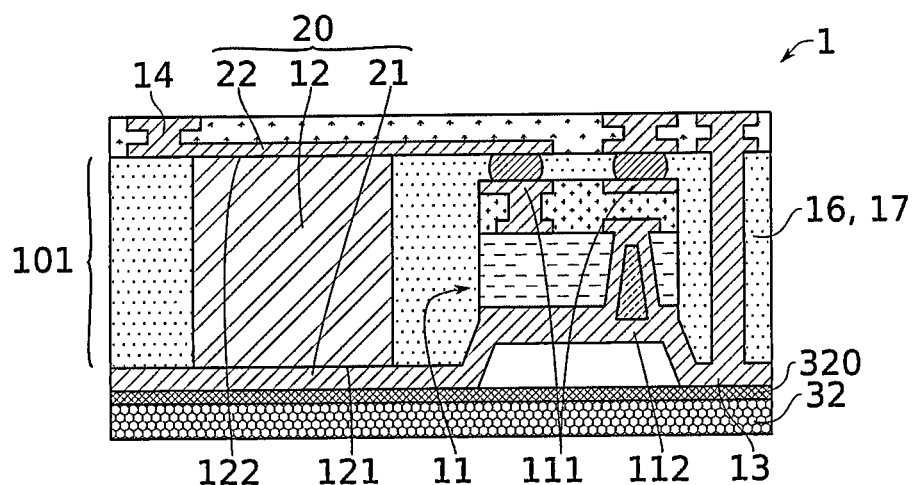
Figure 41:
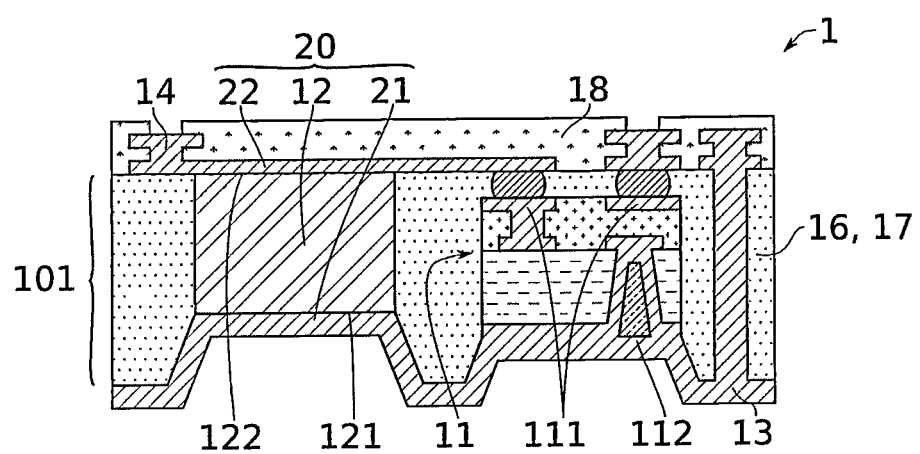
FIG. 41 illustrates a cross-sectional view of a fourth embodiment of the radio frequency front-end module according to the invention obtained by implementation of the "RDL (redistribution layer) First" manufacturing method.

It is noted that the transfer such as illustrated in FIGS. 38A and 40A does not particularly induce the necessity to adapt the finalisation steps of the front-end module 1 such as described above, in reference to FIGS. 39 and 40.

After removal of the second carrier substrate 32, the front-end module 1 is obtained, such as illustrated in FIG. 41.

Figure 42:
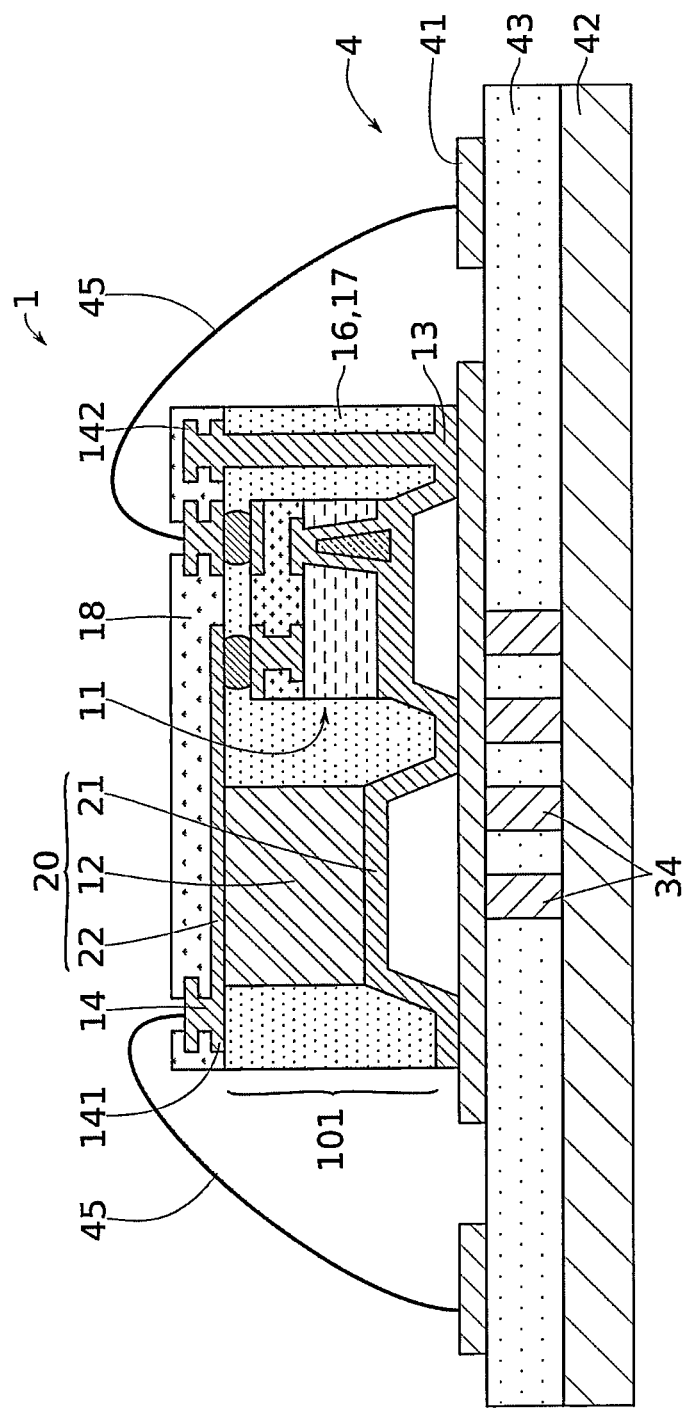
FIG. 42 illustrates a cross-sectional view of a mounting, on an evaluation board, of the radio frequency front-end module illustrated in FIG. 41.

In the same way as discussed above, the front-end module 1 is thus manufactured and ready to be assembled to the other components of a radio frequency system or on an evaluation board 4 of the module 1, for example, as illustrated in FIG. 42. It is noted that the assembly such as illustrated in FIG. 42 incorporates two connections per electrical wire bonding 45.

It is perceived that, in the front-end modules 1 according to the invention obtained by the third and fourth embodiments of the method according to the invention, the different electrical connection levels 141 and 142 are no longer separated from one another by the disc 12, such that the distance which separates these metallising levels is no longer determined by the thickness of the disc 12; this gives the front-end modules 1 obtained by implementation of the second approach described above, an optimal heat dissipation, whatever the configuration, and in particular, whatever the thickness of the disc.

However, it is noted that, when the disc 12 has a thickness less than that of the radio frequency integrated circuit 11 (this being typically less than 100 microns, including the thickness of the solder bumps), the third and fourth embodiments of the method according to the invention can require to open the dielectric material 16, 17 above the disc 12 (after having placed the disc and covered the disc and the rest of the dielectric), to create a cavity (or recess) 210 (see, for example, FIG. 44) in itself and to be able to reconnect to the ground there. Similarly, if a pillar 19 has a height greater than the thickness of the integrated circuit 11 and of the disc 12, it can be necessary to hollow out a cavity above each of these elements. It will be noted that the first and second embodiments of the method according to the invention do not have this limit.

It is noted that each of the four embodiments described above of the manufacturing method according to the invention comprises the following steps:

Providing a radio frequency integrated circuit 11, a disc 12 with the basis of a self-biased magnetic material, a first carrier substrate 31 and a second carrier substrate 32, the radio frequency integrated circuit 11 comprising several electrical connection zones 111, 112, a first zone 111 of which intended to receive and/or transmit an electrical signal and a second zone 112 intended to be connected to the ground, and the disc 12 comprising a first main surface 121 and a second main surface 122 opposite the first, then Assembling the radio frequency integrated circuit 11 and the disc 12 by serving as the first carrier substrate 31, as a support for the first steps of manufacturing the front-end module, then as a transfer substrate onto the second support substrate 32 for the second steps of manufacturing the front-end module; by using at least one from among a first dielectric material 16 and a second dielectric material 17 to maintain mechanically at least the radio frequency integrated circuit 11 and the disc 12 in a relative position to each other, thanks to a "coating" of the integrated circuit 11 and of the disc 12 by a dielectric material 16, 17 made by a FOWLP-type packaging method; by forming a redistribution layer RDL of electrical connections placed above the coating layer comprising said first dielectric material and comprising a metal track for electrical connection, connecting the second main surface 122 of the disc 12 and said first electrical connection zone 112 of the integrated circuit 11 to enable the transmission of an electrical signal between the disc and the integrated circuit.

Moreover, the same applies for a fifth embodiment of the manufacturing method according to the invention, which comprises:

the deposition, for example, by plating a thick copper layer on a first carrier substrate, then the patterning of this layer (or the "creation/formation of patterns in this layer") to create metal pillars, the transfer of the radio frequency integrated circuit 11 and of the disc 12 between the copper pillars, the deposition of the first dielectric material 16, by overmoulding, on the first carrier substrate, then an optional grinding, if necessary (if the disc 12 is of a thickness less than that of the radio frequency integrated circuit 11), the formation of a cavity 210 in the first dielectric material 16, so as to expose one of the main surfaces of the disc 12, the deposition of a ground plane, then its optional patterning, the transfer onto a second carrier substrate, the deposition of a first metallising level, then its patterning, the deposition of a dielectric material 18, before that of a second metallising level, then its optional patterning, and the formation of connecting pads.

This fifth embodiment such as described above, although it is not illustrated in the accompanying figures, and therefore despite all covered by the scope of the accompanying claims. Its variant described above falls into the scope of the "RDL First" approach described above, but the fifth embodiment can equally be available according to another variant adapted to the "Die First" approach described above.

It is also noted that each of the first four embodiments described above of the manufacturing method according to the invention, is such that:

one from among the radio frequency integrated circuit 11 and the disc 12 is first transferred onto either from among the first support substrate 31 and the second support substrate 32 before either from among the first dielectric material 16 and the second dielectric material 17 is not used to maintain it mechanically in the position of its transfer and the other from among the radio frequency integrated circuit 11 and the disc 12 is first transferred onto either from among the first support substrate 31 and the second support substrate 32 before either from among the first dielectric material 16 and the second dielectric material 17 is not used to maintain it mechanically in the position of its transfer, including the fifth embodiment introduced above, and/or at least one from among the first metal track for electrical connection 13 and the second metal track for electrical connection 14 is formed before the transfer of the disc 12, excluding the fifth embodiment introduced above.

It is noted that, if at least one of the discs 12 is thick, it is actually rather interesting to implement the method according to the invention according to the second approach, resulting in the arrangement of the integrated circuit 11 and of the disc 12 in one same level of the front-end module 1. If, conversely, the disc 12 is thin, thinner than the integrated circuit 11, a choice between first and second approaches can be covered. Indeed, the second approach involves an additional method step to make the first metal track for electrical connection 13 connected to the ground on the back side 114 of the integrated circuit 11 and requires integrated circuits 11 with TSV 115. If the disc 12 is thin, the first approach can therefore be preferable, as the excess thickness of the redistribution layer RDL is low and there is at least one step. Furthermore, when the integrated circuit 11 and the disc 12 are on different layers, in practice, they can be put closer, even overlapped, even superposed if the magnetic radiation is compatible with a correct operation of the integrated circuit 11 and increase surface area.

Figure 43:
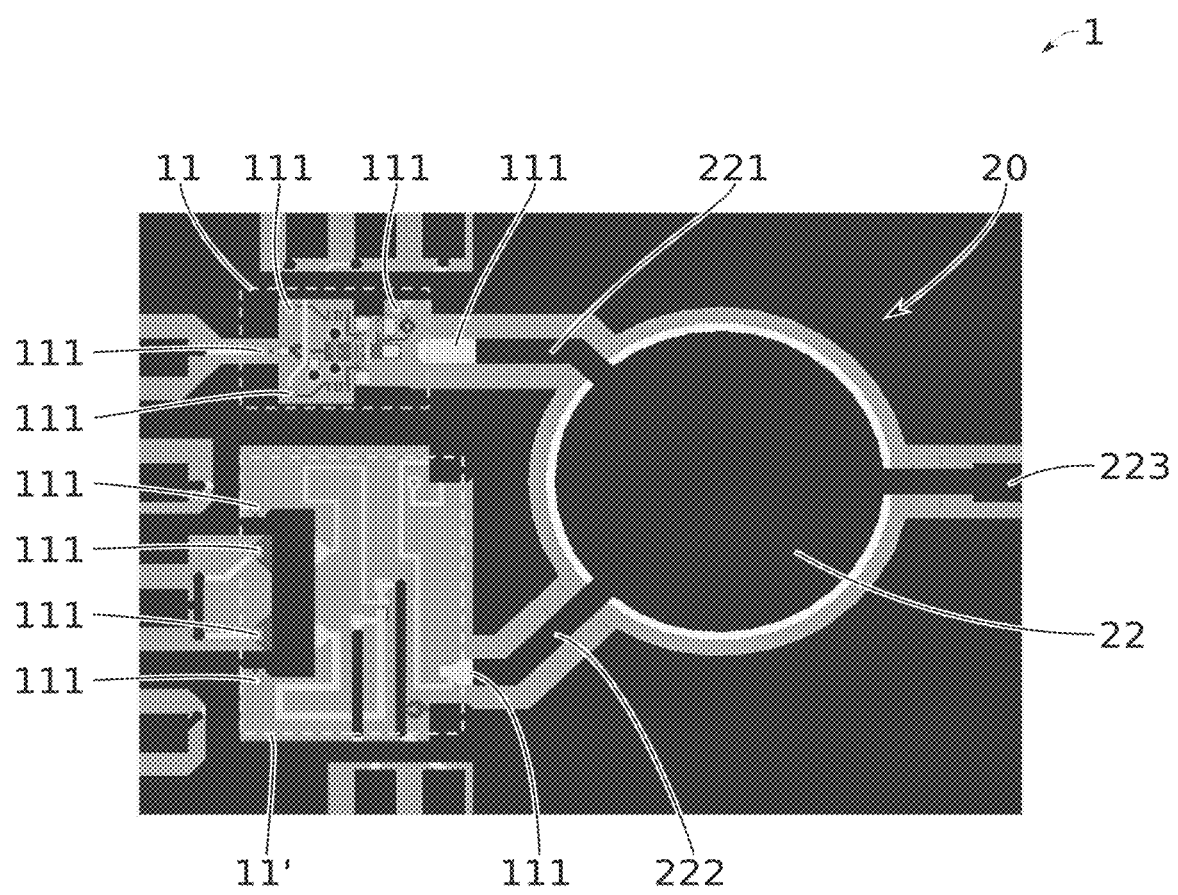
FIGS. 43 to 45 illustrate respectively a top view, a three-quarter bottom view and a three-quarter top view of the mounting illustrated in FIG. 42 and corresponding to the electronic diagram of FIG. 46.
Figure 44:
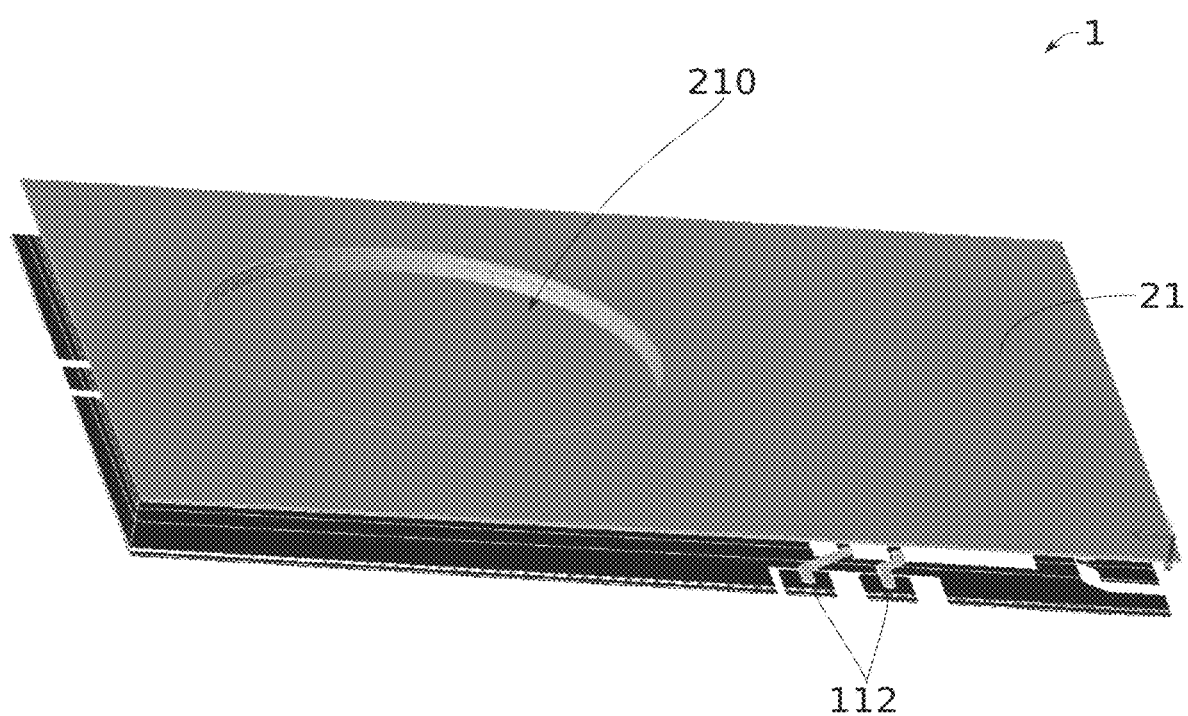
Figure 45:
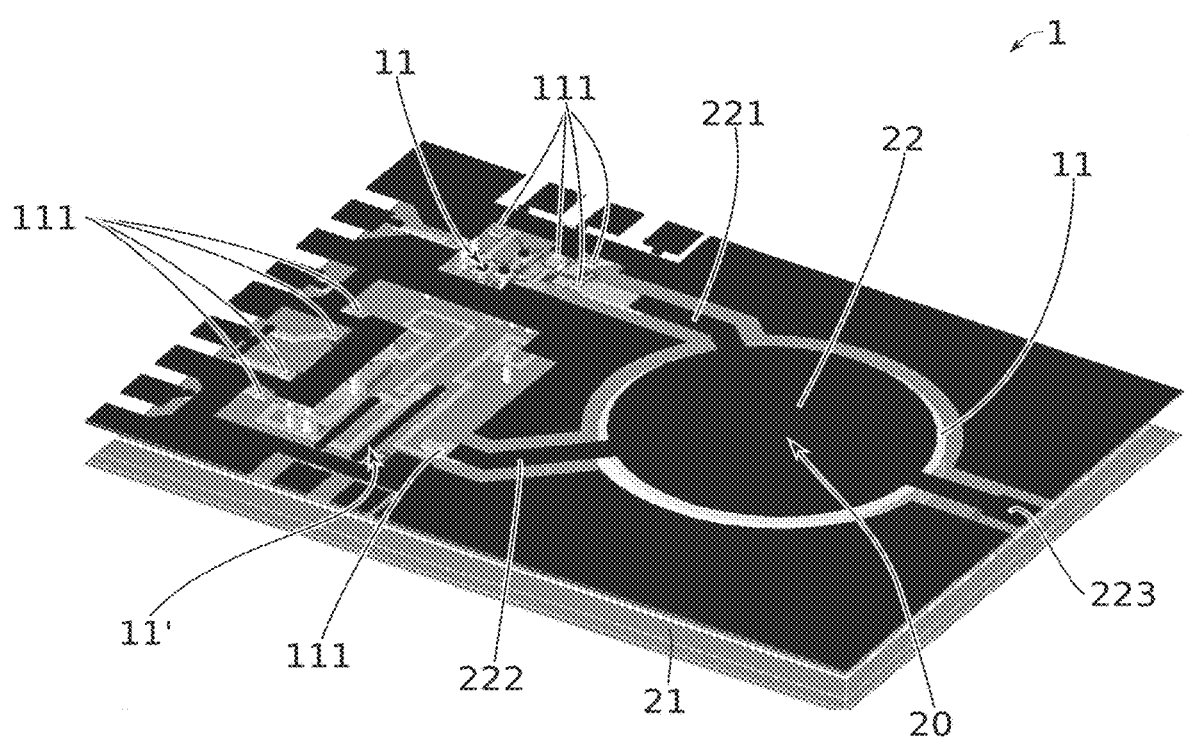

Reference has already been made above to FIGS. 43 and 45, which are more complete and more detailed than the figures in reference to which the different embodiments of the manufacturing method according to the invention have been described above. It is noted that FIG. 44 shows, on the back side of the front-end module 1, a cavity 210 illustrating the variation in level of the metal track for electrical connection 13, which is referenced by the same reference in FIG. 41.

Furthermore, it appears, in FIGS. 43 to 45, that the packaging technology used makes it possible to integrate one to more metal levels buried in a dielectric material, for example, of the oxide type, so as to:

produce the input/output and ground pads of the front-end module 1, drawing the ground plane, as well as the signal level of the magnetic component 20, make the electrical junction between the radio frequency integrated circuit(s) 11, 11' and the magnetic component, make the junction between the inputs/outputs of the radio frequency integrated circuit(s) 11, 11' and of the inputs/outputs of the front-end module 1, and perform the passive functions such as inductances, transformers, baluns, etc.

Figure 46:
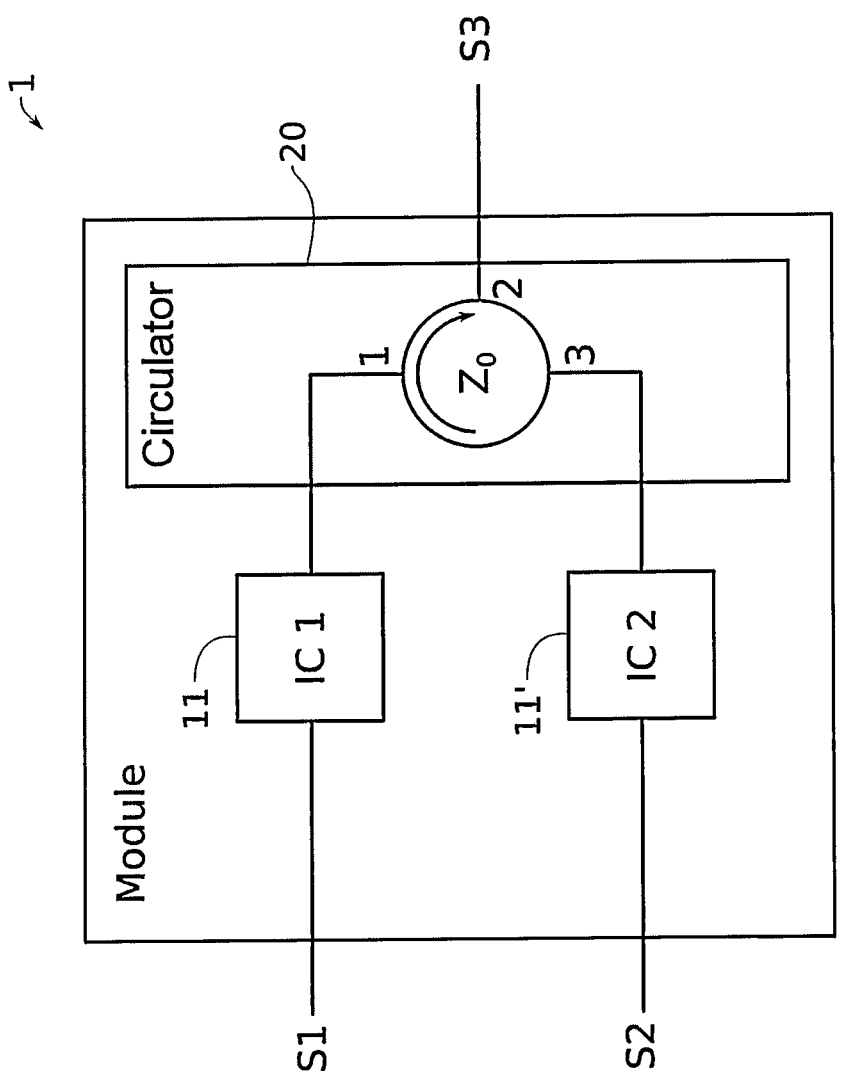
FIGS. 46 and 46A to 46I each illustrate an electrical diagram of an example of a radio frequency front-end module which can be manufactured by implementation of any one of the embodiments of the manufacturing method according to the invention.
Figure 46A:
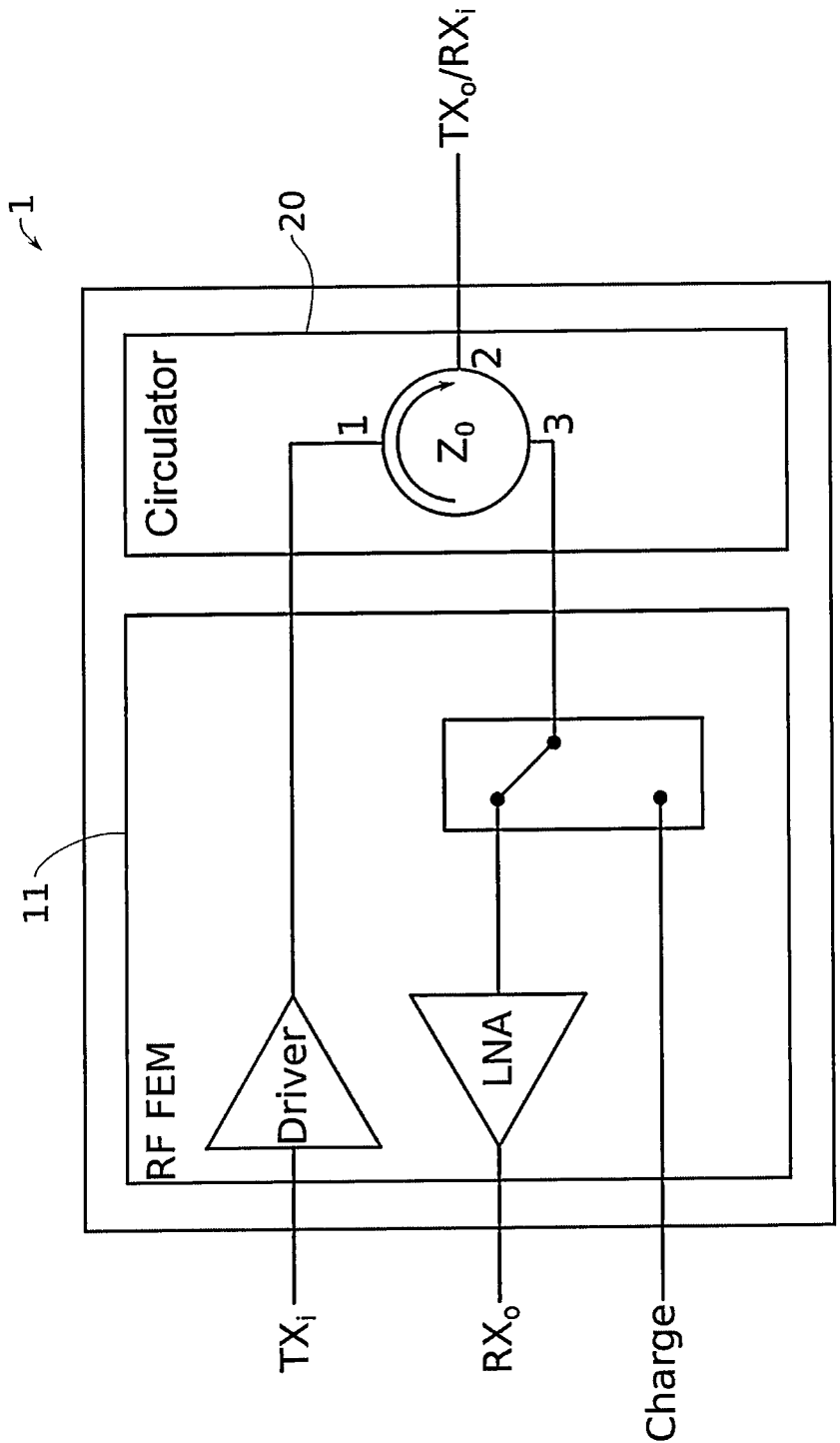
Figure 46B:
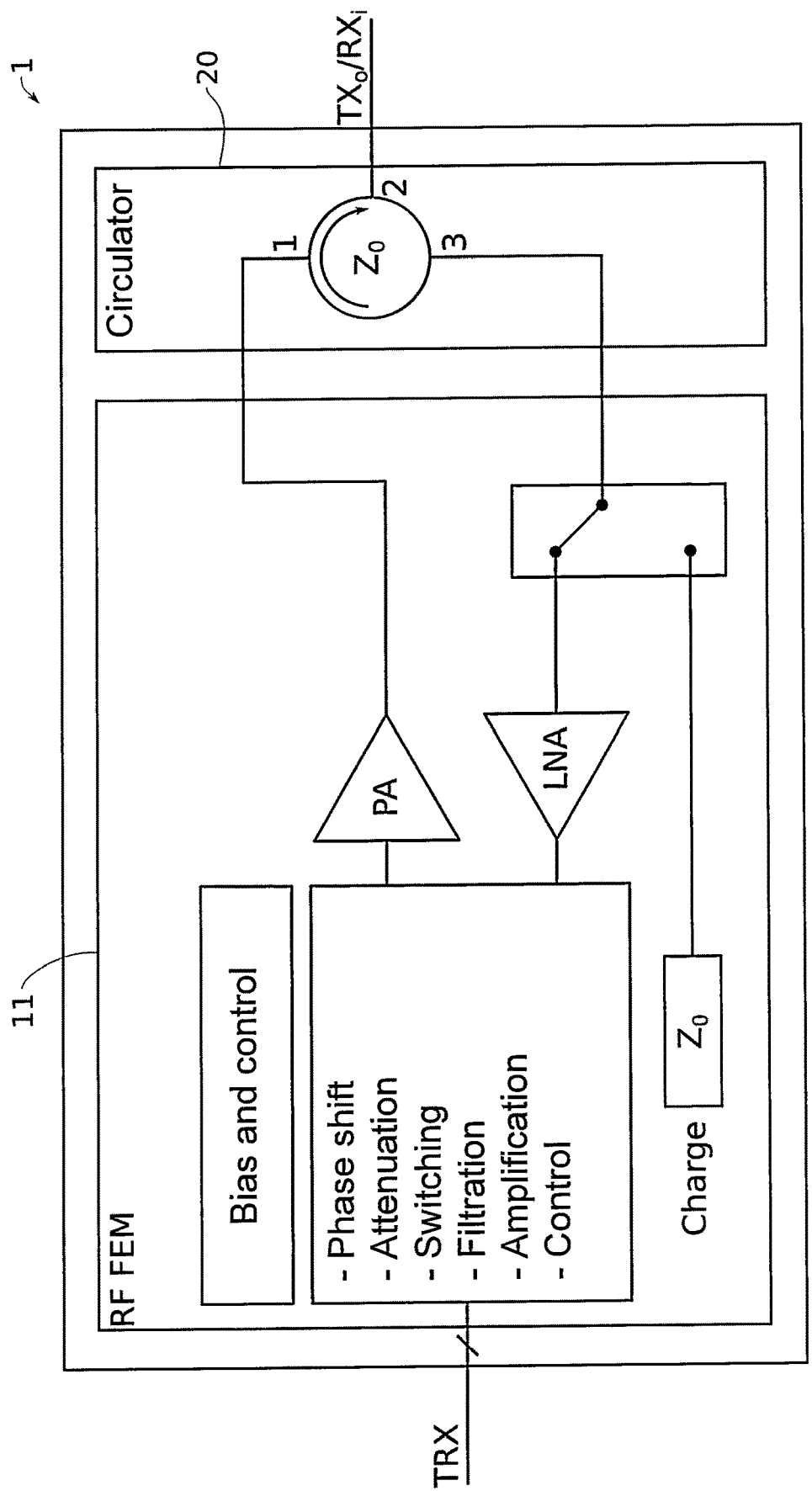
Figure 46C:
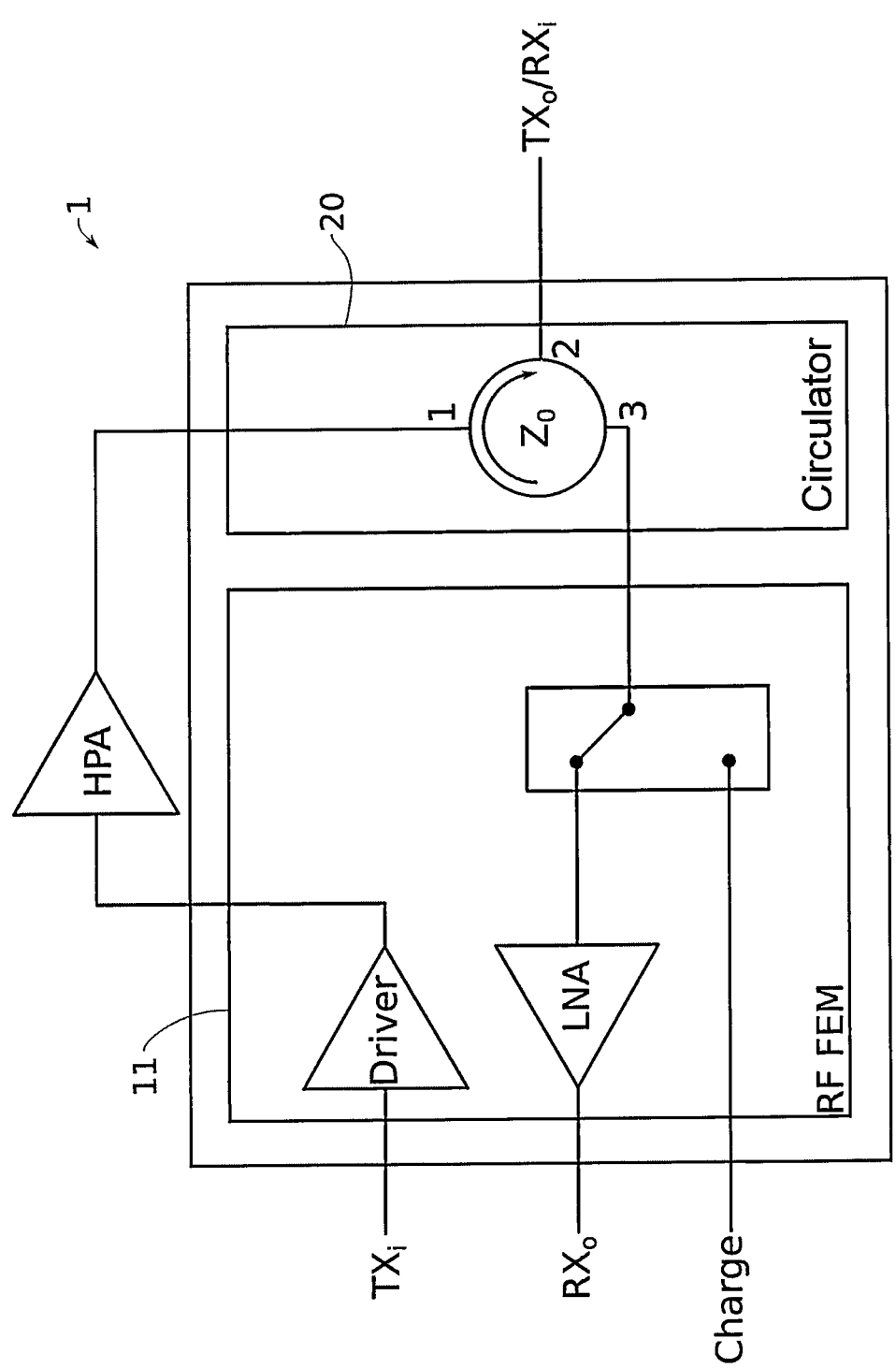
Figure 46D:
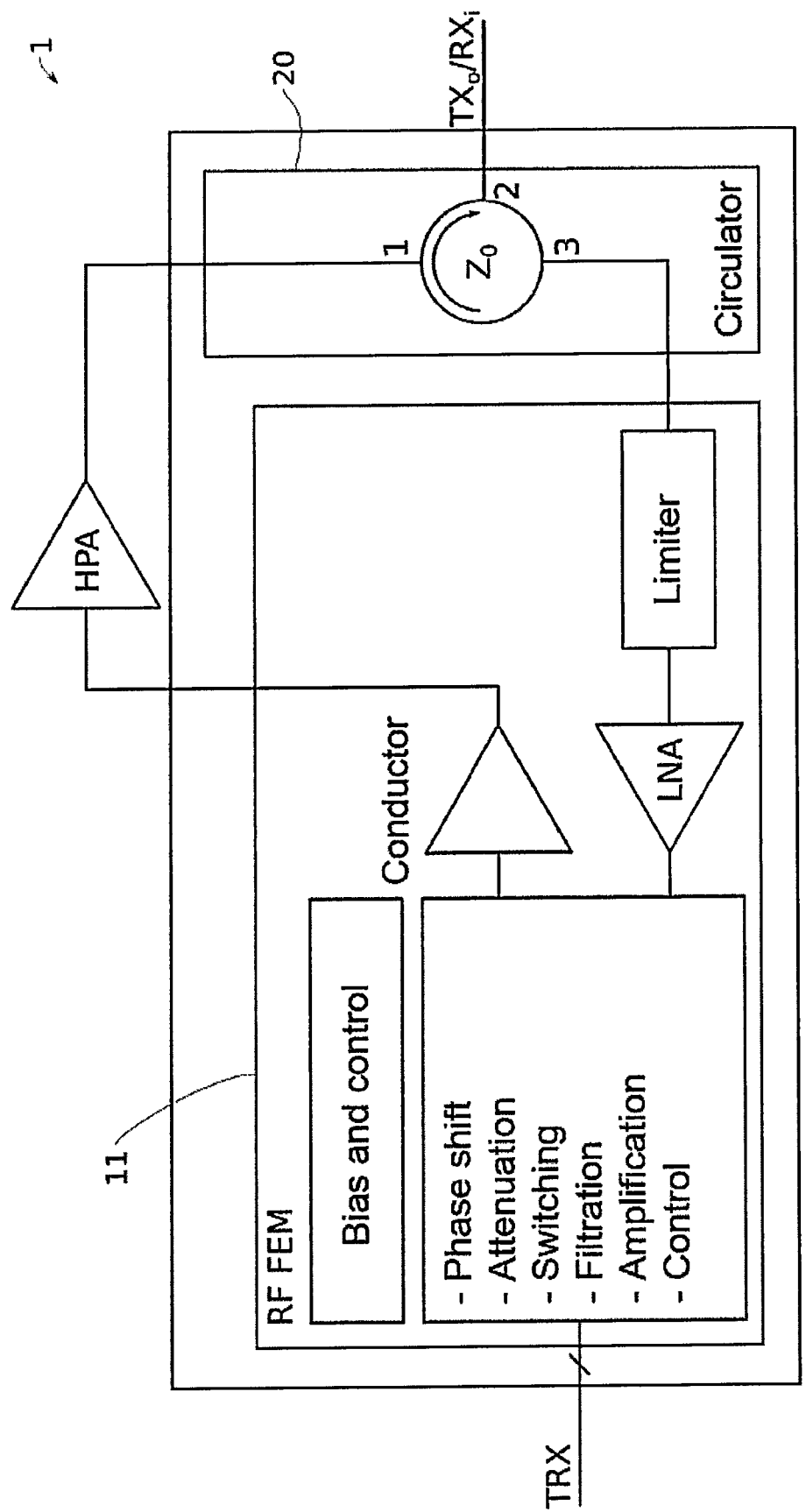
Figure 46E:
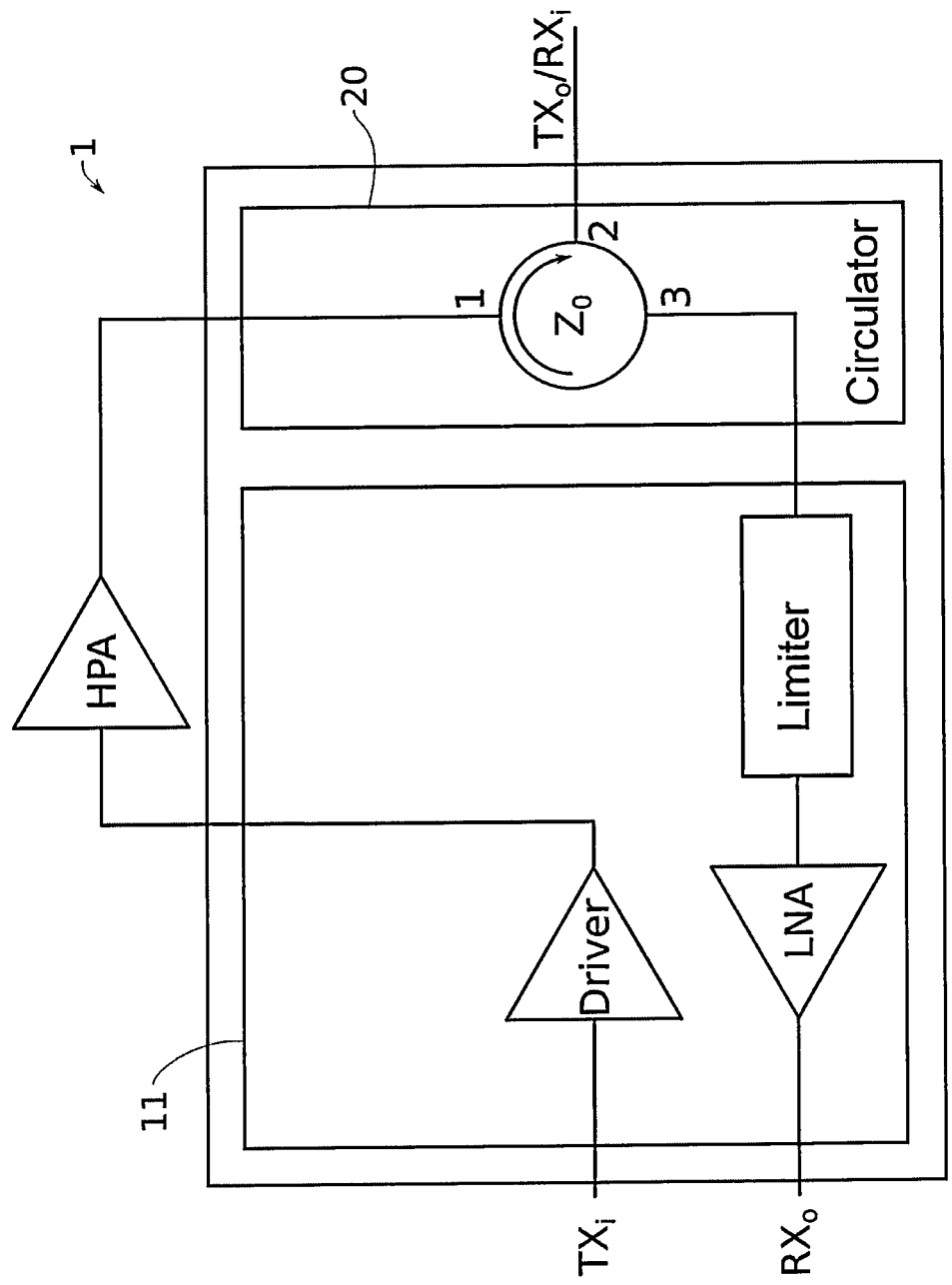
Figure 46F:
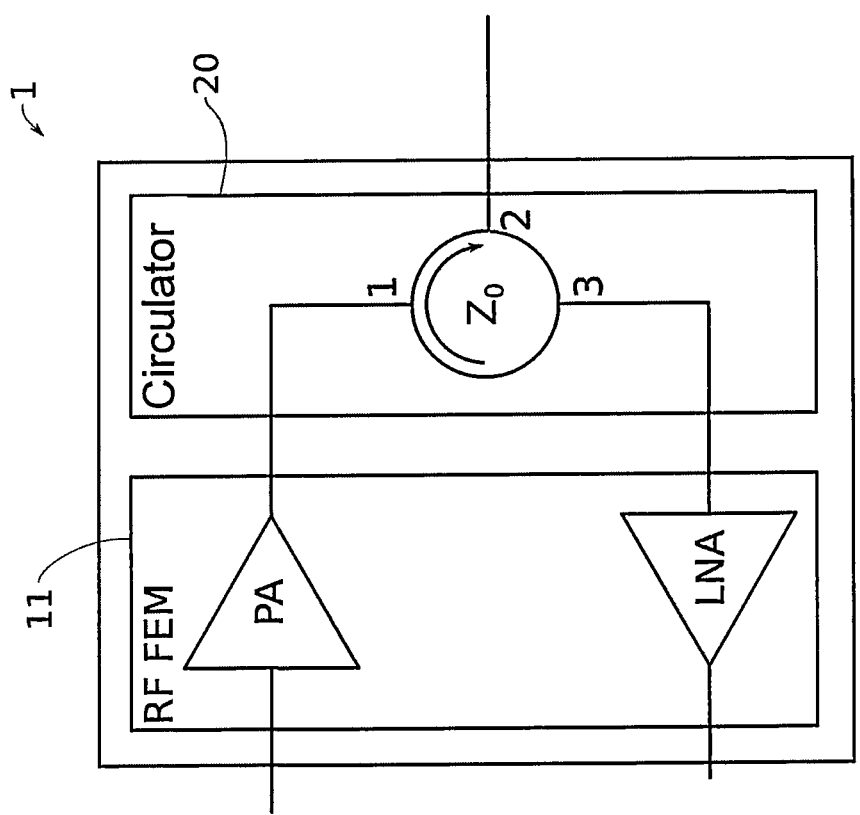
Figure 46G:
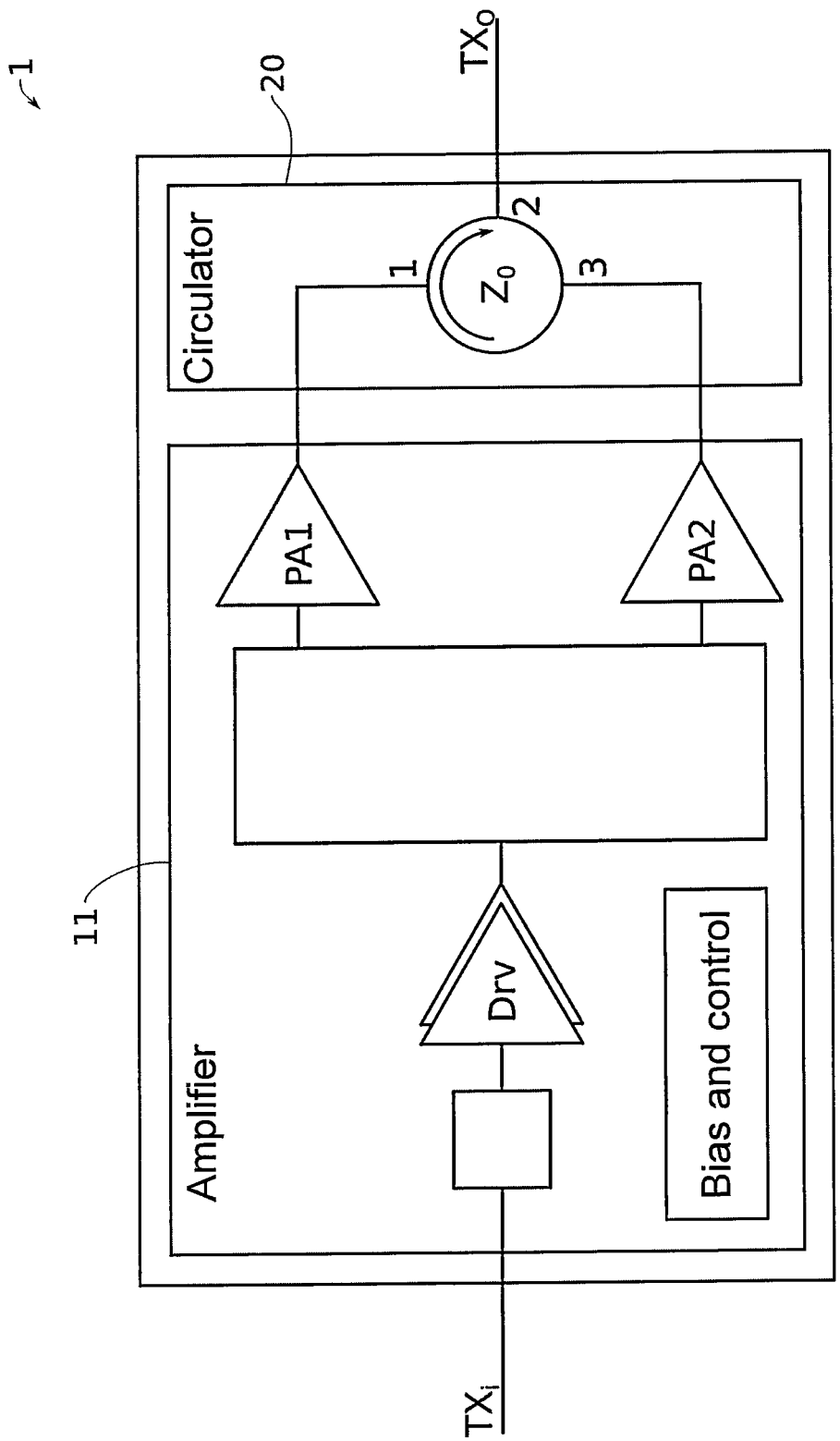
Figure 46H:
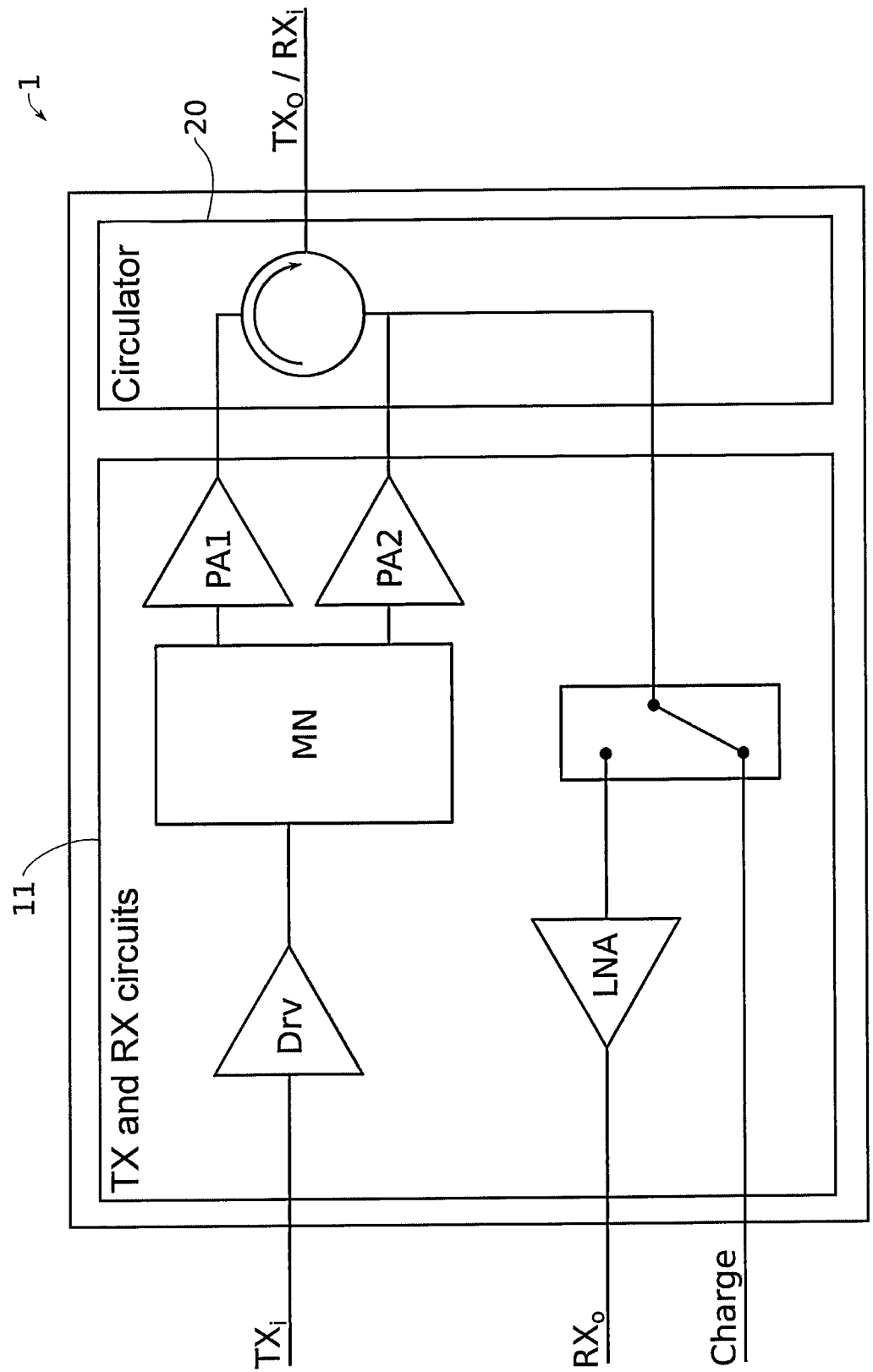
Figure 46I:
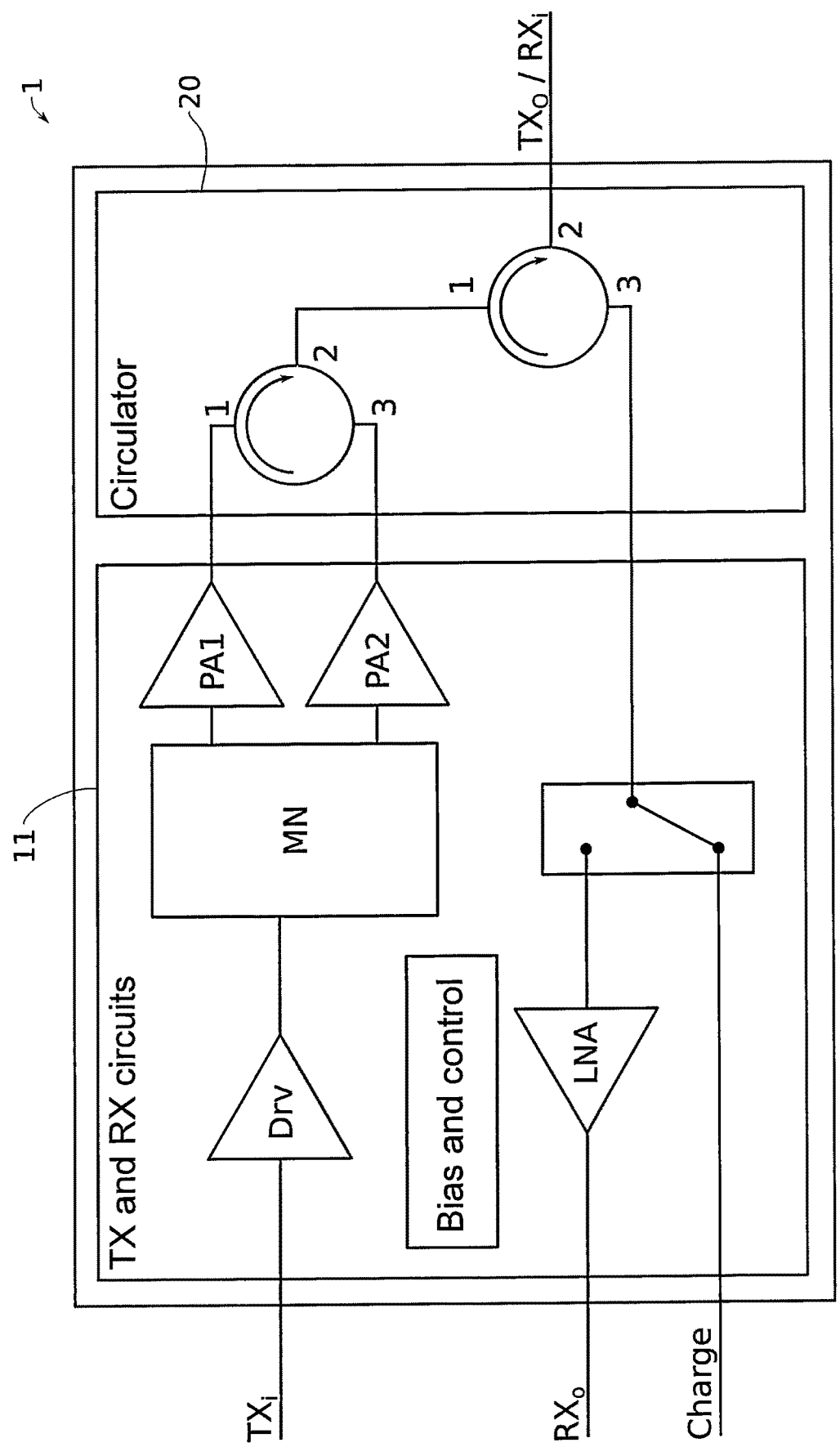

By comparing FIGS. 45 and 46 to one another, it appears that FIG. 46 can be seen as a simplified electrical diagram of the diagram of FIG. 45. FIGS. 46A to 46I illustrate other examples, than that given in FIG. 46, such electrical diagrams of front-end modules which could be obtained according to any one of the embodiments of the manufacturing method described above. In other words, FIGS. 46A to 46I illustrate electrical diagrams of front-end modules according to the invention, although these simplified diagrams can moreover be known. It results from its different examples given, that the present invention can be seen as a new integration technology for the manufacture of radio frequency front-end modules (FEM), of power amplifier (PA) 5 and radio frequency TRX emission and transmission modules which integrates at least one magnetic component 20, such as a circulator. This new integration technology can be qualified as low-cost FOWLP (Fan-Out Wafer-Level Packaging)-type integration technology. It is further compatible with the integration of several integrated circuits and with an assembly involving various technologies.

The present invention thus responds to a strategic need regarding transmission modules used in radars and communication platforms and which, in particular, is based on the miniaturisation of semiconductive-based electronics, as well as their integration with magnetic control elements, comprising, in particular, ferrite, such as a circulator and/or an isolator. A circulator is indeed one of the most important elements to enable the simultaneous transmission in one same frequency band (Full-duplex). In addition, the low-noise power amplifier PA 5 (LNA), for example such as illustrated in FIGS. 46A to 46H, can, by implementation of the new integration technology proposed, be protected against the antenna charge mismatches, which contributes to ensuring an optimal operation of the radio frequency systems integrating front-end modules 1 according to the invention.

Due to its high integration level, the new integration technology proposed, makes it possible to reduce the interconnections, and in particular, their length, between the radio frequency integrated circuit 11 and the magnetic component 20. The size of the front-end module 1, the losses, in particular charge losses, and energy consumption are thus advantageously reduced. By proposing the integration of the magnetic material in the form of a solid disc 12 of this material in an FOWLP-type integration technology, the present approach is distinguished from the approaches which, according to the prior art, provide the integration of the magnetic material according to standard microelectronic processes. Thanks to the proposed approach, the positioning of the magnetic material is well-controlled and does not require adhesive, such as an epoxy or an adhesive, to mechanically stabilise the magnetic component 20 and its junctions. Moreover, the new integration technology makes it possible to avoid the dissipation of wide semiconductive substrate zones, which is all the more interesting than those, are sometimes very expensive, particularly when this relates to III-V composition substrates.

To go further, the new integration technology proposed makes the antenna integration possible on a front-end module 1 according to the invention, in particular via its pads 144, and/or as needed by using the technological option known as TMV. This technology can also be used to shield the electrical field or to also create architecture circulator more advanced than those illustrated in FIGS. 47A and 47B, for example a circulator topology known as SIW (Substrate Integrated Waveguide), than a heat dissipator.

Furthermore, and as already mentioned above, the two approaches described above enable the integration of the disc 12 with the basis of a magnetic material or different shapes and dimensions.

Each abovementioned step which consists of a transfer of an element onto another can advantageously be carried out by a "pick-and-place"-type machine.

The different conductive tracks, as well as the different conductive levels, can incorporate TMV technology, a plating technology, and/or patterning technology.

The invention is not limited to the embodiments and implementation described above, and extends to all the embodiments and implementations covered by the claims.

For example, the main surfaces of the disc do not necessarily take the form of a disc, but can take that of a square, of a triangle, of a pentagon, etc.

For example, if the second approach described above through the third and fourth embodiments of the method are particularly suitable for integrated circuits 11 with TSV 115, they are not, for all that, limited to such integrated circuits 11, but are on the contrary, adaptable to other integrated circuit architectures, such as, for example, that illustrated by FIG. 48A. This adaptation can, in particular, pass through the use of a ground increase pillar passing through the dielectric material 16 up to the redistribution layer RDL to "recover" the ground.

The invention claimed is:

1. A radio frequency transmission front-end module, comprising:
   a radio frequency integrated circuit comprising at least two electrical connection zones a first zone of which, intended to transmit a signal and a second zone intended to be connected to the ground,
   a disc with the basis of a self-biased magnetic material comprising a first main surface and a second main surface opposite to the first,
   wherein:
   a first dielectric material and a second dielectric material forming a respective side coating layer of the radio frequency integrated circuit and of the disc by maintaining them mechanically in position to each other, and
   a redistribution layer RDL of electrical connections placed above the coating layer, comprising said first dielectric material, the redistribution layer RDL comprising a metal track for electrical connection of the signal connecting the second main surface of the disc and said first electrical connection zone of the integrated circuit to enable the transmission of an electrical signal between the disc and the integrated circuit.

2. The front-end module according to claim 1, wherein the first main surface of the disc is electrically connected to a first external connection pad of the module intended to be connected to the ground, and wherein the second electrical connection zone of the radio frequency integrated circuit is electrically connected to the first pad or to a second external connection pad of the module and intended to be connected to the ground, also.

3. The front-end module according to claim 1, wherein the magnetic component constitutes or comprises at least one from among a circulator, a gyrator and an isolator.

4. The front-end module according to claim 1, wherein the first dielectric material and the second dielectric material extend over one same level of the front-end module by forming one single layer, wherein the radio frequency integrated circuit and the disc are placed.

5. The front-end module according to claim 4, wherein the first main surface of the disc and the second electrical connection zone of the radio frequency integrate circuit are connected by a metal track for connection to the ground formed in contact with the coating layer, comprising the first dielectric material, on the side opposite the redistribution layer RDL.

6. The front-end module according to claim 1, wherein the first dielectric material forms a first layer, wherein the radio frequency integrated circuit is integrated and the second dielectric material forms a second layer, wherein the disc is integrated, the second layer of the second dielectric material corresponding totally or partially to dielectric layers constituting the redistribution layer RDL of electrical connections.

7. The front-end module according to claim 1, wherein the self-biased magnetic material constituting the disc is with the basis of at least one from among: a ferrite and a hexaferrite.

8. The front-end module according to claim 1, wherein a thickness of the disc between its main surfaces is greater than a thickness of the radio frequency integrated circuit between its front side and its back side.

9. The front-end module according to claim 1, wherein the metal track for electrical connection of the signal has a three-dimensional geometry and/or is formed on at least two metal levels for electrical connection interconnected with one another by way of metal vias, wherein the metal track for connection to the ground has a three-dimensional geometry and/or is formed on at least two metal levels for electrical connection interconnected with one another by way of metal vias.

10. The front-end module according to claim 1, wherein the radio frequency integrated circuit has at least one via extending from the back side of the radio frequency integrated circuit through a semiconductive substrate, wherein active components of the radio frequency integrated circuit are formed, and wherein the back side of the radio frequency integrated circuit consists of a zone for connection to the ground of the radio frequency integrated circuit.

11. A method for manufacturing a radio frequency transmission front-end module, comprising:
providing a radio frequency integrated circuit, a disc with the basis of a self-biased magnetic material, a first carrier substrate and a second carrier substrate, the radio frequency integrated circuit comprising several electrical connection zones, a first zone of which, intended to transmit an electrical signal and a second zone intended to be connected to the ground, and the disc comprising a first main surface and a second main surface opposite the first, then
assembling the radio frequency integrated circuit and the disc by serving as the first carrier substrate as a support for first steps of manufacturing the front-end module, then as a transfer substrate on the second support substrate for second steps of manufacturing the front-end module; by using at least one from among a first dielectric material and a second dielectric material to form, by an FOWLP-type packaging method, a respective side coating layer of said radio frequency integrated circuit and of the disc and maintain them mechanically in position to each other; by forming a redistribution layer RDL of electrical connections placed above the coating layer, comprising said first dielectric material and comprising a metal track for electrical connection of the signal connecting the second main surface of the disc and said first electrical connection zone of the integrated circuit to enable the transmission of an electrical signal between the disc and the integrated circuit.

12. The manufacturing method according to claim 11, comprising the formation of an electrical connection between the first main surface of the disc and a first external connection pad of the module intended to be connected to the ground, and comprising the formation of an electrical connection between the first main surface of the disc and a first external connection pad of the module intended to be connected to the ground, and comprising the formation of an electrical connection between a second electrical connection zone of the radio frequency integrated circuit and a first pad or a second external connection pad of the module and intended to be connected to the ground, also.

13. The manufacturing method according to claim 12, comprising the formation of an electrical connection between the first main surface of the disc and the second electrical connection zone of the radio frequency integrated circuit by a metal track for connecting the ground formed in contact with the coating layer, comprising the first dielectric material, on the side opposite the redistribution layer RDL.

14. The manufacturing method according to claim 11, wherein one from among the radio frequency integrated circuit and the disc is first transferred onto either from among the first support substrate and the second support substrate before either from among the first dielectric material and the second dielectric material is not used to maintain it mechanically in the position of its transfer and the other from among the radio frequency integrated circuit and the disc is first transferred onto either from among the first support substrate and the second support substrate before either from among the first dielectric material and the second dielectric material is not used to maintain it mechanically in the position of its transfer.

15. The manufacturing method according to claim 11, comprising:
a transfer of the radio frequency integrated circuit and of the disc on the first carrier substrate, the radio frequency integrated circuit being transferred onto the first carrier substrate by its front side and the disc being transferred onto the first carrier substrate by one of its first and second main surfaces,
a deposition of the first dielectric material on the first carrier substrate at least around the radio frequency integrated circuit and of the disc,
a deposition of a metal track for connection to the ground, to obtain on the first carrier substrate, a first part of the front-end module, then
a transfer of the first part of the front-end module from the first carrier substrate on the second carrier substrate by the side of the first part of the front-end module on which the metal track for connection to the ground is exposed, such that the first part of the front-end module can be treated from its exposed surface after its transfer, to finish forming the front-end module.

16. The manufacturing method according to claim 15, further comprising:
a formation of the metal track for electrical connection of the signal, either on the exposed surface of the first part of the front-end module after its transfer, or on the first carrier substrate before transfer of the radio frequency integrated circuit and of the disc.

17. The manufacturing method according to claim 16, wherein the formation of the metal track for electrical connection of the signal comprises the creation of at least two metal levels of electrical connection interconnected with one another by way of metal vias through a third dielectric material.

18. The manufacturing method according to claim 16, further comprising, before the deposition of the metal track for connection to the ground:
a grinding of the first dielectric material to expose the back side of the radio frequency integrated circuit and the main surface of the disc opposite that by which the disc has been transferred onto the first carrier substrate.

19. The method according to claim 16, further comprising, when the formation of the metal track for electrical connection of the signal is done on the first carrier substrate before transfer of the radio frequency integrated circuit and of the disc:
a formation on the metal track for electrical connection of the signal of a metal pillar for electrical connection of a height greater than the greatest from among a thickness of the radio frequency integrated circuit between its front side and its back side and a thickness of the disc between its main surfaces.

20. The method according to claim 16, further comprising, when the deposition of the first dielectric material is such that it covers the radio frequency integrated circuit and/or the disc, and if necessary, the top of the metal pillar:
a step of grinding the first dielectric material, potentially up to exposing that which is from among the back side of the radio frequency integrated circuit and the main surface of the disc opposite that by which the disc has been transferred onto the first carrier substrate is the least covered by the first dielectric material, and if necessary, up to exposing the top of the metal pillar.

21. The method according to claim 11, comprising:
a transfer of the radio frequency integrated circuit on the first carrier substrate by its front side,
a deposition of the first dielectric material on the first carrier substrate at least around the radio frequency integrated circuit,
to obtain, on the first carrier substrate, a first part of the front-end module, then
a transfer of the first part of the front-end module from the first carrier substrate on the second carrier substrate by the side of the first part of the front-end module opposite that by which the first part of the front-end module rests on the first support substrate,
such that the first part of the front-end module can be treated from its exposed surface after its transfer, to finish forming the front-end module, then
a deposition of a first metal level for electrical connection on the exposed surface of the first part of the front-end module, so as to have two parts, electrically separate from one another, each constituting a part of one from among the metal track for connection to the ground and the metal track for electrically connecting the signal,
a deposition of the second dielectric material on the first metal level for electrical connection, then an etching of the second dielectric material, so as to form a cavity located facing the part of the first metal level constituting a part of the metal track for electrical connection of the signal and intended to house the disc and so as to form vias to a second metal level for electrical connection for each from among the metal track for connection to the ground and the metal track for electrical connection of the signal,
a transfer of the disc into the formed cavity,
a deposition of the second metal level for electrical connection on the surface of the second dielectric material and the exposed main surface of the disc, so as to each form, from among the metal track for connection to the ground and the metal track for electrical connection of the signal, by filling each formed via, and
a formation of input/output pads of the front-end module on the second metal level for electrical connection.

22. The manufacturing method according to claim 11, comprising:
a deposition of one of the first and second metal levels for electrical connection on the first carrier substrate, so as to have at least two parts, electrically separate from one another, each constituting a part of one from among the metal track for connection to the ground and the metal track for electrical connection of the signal,
a transfer of the disc on a part of the metal level deposited beforehand, said part constituting a part of the metal track for electrical connection of the signal,
a formation of a metal pillar for electrical connection on each of two parts electrically separate from one another of the metal level deposited beforehand,
a deposition of one from among the first dielectric material and the second dielectric material on the metal level for electrical connection deposited beforehand and at least around the disc,
a deposition of another of the two metal levels for electrical connection on the dielectric material deposited beforehand, an exposed main surface of the disc and the top of each metal pillar, so as to each form from among the metal track for connection to the ground and the metal track for electrical connection of the signal,
a transfer of the radio frequency integrated circuit by its front side on the other of the two metal levels for electrical connection, so as to electrically contact each from among the metal track for connection to the ground and the metal track for electrical connection of the signal,
a deposition of the first dielectric material on the other of the two metal levels for electrical connection at least around the radio frequency integrated circuit,
to obtain, on the first carrier substrate, a first part of the front-end module,
a transfer of the first part of the front-end module from the first carrier substrate on the second carrier substrate by the side of the first part of the front-end module opposite that by which the first part of the front-end module rests on the first support substrate,
such that the first part of the front-end module can be treated from its exposed surface after its transfer, to finish forming the front-end module, then
a formation of input/output pads of the front-end module on the first metal level for electrical connection.

23. The manufacturing method according to claim 11, further comprising, after assembly of the radio frequency integrated circuit and of the disc:
   the removal of the second carrier substrate.

* * * * *